United States Patent
Watanabe et al.

(10) Patent No.: US 7,617,227 B2
(45) Date of Patent: Nov. 10, 2009

(54) STORAGE CONTROL SUB-SYSTEM COMPRISING VIRTUAL STORAGE UNITS

(75) Inventors: Haruaki Watanabe, Isehara (JP); Kiichiro Urabe, Isehara (JP); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 11/654,542

(22) Filed: Jan. 18, 2007

(65) Prior Publication Data
US 2007/0130168 A1    Jun. 7, 2007

Related U.S. Application Data

(63) Continuation of application No. 10/822,708, filed on Apr. 13, 2004, now Pat. No. 7,191,251.

(30) Foreign Application Priority Data
Feb. 6, 2004    (JP) .............................. 2004-031150

(51) Int. Cl.
*G06F 17/30* (2006.01)
(52) U.S. Cl. ..................................... 707/100
(58) Field of Classification Search ............... 707/2, 707/204, 100; 709/226
See application file for complete search history.

(56) References Cited

U.S. PATENT DOCUMENTS

| | | | |
|---|---|---|---|
| 5,440,708 A | 8/1995 | Takagi | ........................ 711/208 |
| 5,651,133 A | 7/1997 | Burkes et al. | ................ 711/114 |
| 5,696,934 A | 12/1997 | Jacobson et al. | |
| 6,557,073 B1 | 4/2003 | Fujiwara et al. | |
| 6,883,083 B1 | 4/2005 | Kemkar | ....................... 711/203 |
| 2003/0110263 A1* | 6/2003 | Shillo | ......................... 709/226 |
| 2003/0204701 A1 | 10/2003 | Mimatsu et al. | |
| 2004/0225697 A1 | 11/2004 | Asano et al. | |
| 2005/0071559 A1 | 3/2005 | Tamura et al. | |
| 2005/0262298 A1 | 11/2005 | Lubbers et al. | ............. 711/112 |

FOREIGN PATENT DOCUMENTS

| | | |
|---|---|---|
| JP | 09288547 | 11/1997 |
| JP | 10232800 | 9/1998 |
| JP | 11345158 | 12/1999 |

\* cited by examiner

*Primary Examiner*—Etienne P LeRoux
(74) *Attorney, Agent, or Firm*—Brundidge & Stanger, P.C.

(57) ABSTRACT

A storage control device provided in a storage control system reports a virtual storage capacity value stored in a shared memory, to a host terminal, and ensures that, after the virtual storage capacity value has been stored in the host terminal, the virtual storage capacity value thus reported cannot be changed while the virtual storage unit having the virtual storage capacity value is connected to the host terminal.

10 Claims, 16 Drawing Sheets

FIG. 6

LU-LDEV MANAGEMENT TABLE 162b

| PORT NO. | TARGET ID | LUN | LDEV # | STORAGE CAPACITY | RAID LEVEL | ADDRESS MANAGEMENT INFORMATION | LDEV ATTRIBUTE | DMT-ID | LDEV POOL NO. | STATUS | REPORT HOST ID |
|---|---|---|---|---|---|---|---|---|---|---|---|
| #1 | — | — | LDEV #1 | 30GB | 5 | ...... | POOL LDEV | — | #1 | Ready | ...... |
| | #1 | #002 | LDEV #2 | 100GB | 5 | ...... | POOL LDEV | — | #1 | Ready | ...... |
| | | | LDEV #1 | 200GB | 5 | ...... | VIRTUAL LDEV | 0 | #1, #2 | Ready | ...... |
| | | ...... | ...... | ...... | ...... | ...... | ...... | ...... | ...... | ...... | ...... |
| | #2 | #001 | LDEV #1 | 50GB | 1 | ...... | NORMAL LDEV | — | — | Not Ready | ...... |
| #2 | ...... | ...... | ...... | ...... | ...... | ...... | ...... | ...... | ...... | ...... | ...... |

FIG. 10

STORAGE CONTROL SYSTEM
MANAGEMENT TABLE                              791

| PORT NUMBER | TARGET ID | LUN | VENDOR | MODEL | STORAGE CAPACITY | .... |
|---|---|---|---|---|---|---|
| 0 | 0 | 0 | CO. H | OPEN-3 | 1000GB | .... |
| 1 | 1 | 1 | CO. H | OPEN-9 | 2000GB | .... |
| ⋮ | ⋮ | ⋮ | ⋮ | ⋮ | ⋮ | ⋮ |

STORAGE CONTROL SUB-SYSTEM COMPRISING VIRTUAL STORAGE UNITS

CROSS-REFERENCE TO PRIOR APPLICATION

The present application is a continuation of application Ser. No. 10/822,708, filed Apr. 13, 2004 now U.S. Pat. No. 7,191,251; which claims priority from Japanese Patent Application No. 2004-31150, filed on Feb. 6, 2004, the entire disclosure of which is incorporated herein by reference.

BACKGROUND OF THE INVENTION

1. Field of the Invention

The present invention relates to a storage control sub-system comprising virtual storage units.

2. Description of the Related Art

For example, in a storage system for trunk business use, which handles a large volume of data, a storage control sub-system constructed separately from the host computers (below, referred to as "host terminals") is used to manage data. This storage control sub-system comprises, for example, a RAID (Redundant Array of Independent Inexpensive Disks) constituted by providing a plurality of disk type storage devices in an array fashion.

For example, Japanese Patent Laid-open No. (Hei)9-288547 discloses a system wherein a plurality of physical devices aligned in series are provided as a single virtual device (paragraph 23).

Furthermore, for example, Japanese Patent Laid-open No. (Hei) 11-345158 discloses a method for acquiring a differential dump for a pair of principal and subsidiary volumes which respectively record updates to the principal and subsidiary volumes in respective volume update information, whereby the update information for said subsidiary volume is made to coincide with the update information for said principal volume, when shifted to a mirror state, and when the dump is started, the mirror state is changed to a temporary mirror release state, and the update information for the principal volume is initialized, in addition to which a dump of the updated portion is obtained from said subsidiary volume.

There are storage control sub-systems wherein, for example, of a plurality of logical storage devices (hereinafter, referred to as "LDEV" as an abbreviation of "Logical Device") prepared on one or a plurality of disk type storage devices, a single storage unit constituted by one or more the LDEVs is provided to a host terminal as a LU (Logical Unit). In a storage control system of this kind, for example, an LU pair may be formed wherein one LU is taken to be a primary LU and another LU is taken to be a secondary LU, and the data in the primary LU prior to update may be copied to the secondary LU (in other words, a so-called "snap shot" may be created).

In general, the respective LUs forming the LU pair have the same storage capacity. Therefore, if the storage capacity of the primary LU is large, then an LU having a large storage capacity is also required for the secondary LU. However, in the aforementioned snap shot, the data size of the data prior to update that is to be copied may be small. Therefore, there may be cases in which the storage capacity of the secondary LU is made unnecessarily large.

Furthermore, for example, if the storage control subsystem receives a read capacity command from the host terminal, then it may report the storage capacity of the LU in the storage control sub-system, to the host terminal. Here, if the storage control sub-system reports a different storage capacity to a previously reported storage capacity, with respect to the same LU, then there is a possibility that confusion may result in the host terminal.

SUMMARY OF THE INVENTION

Therefore, the present invention seeks to achieve at the least either one of the following objects (A) and (B).

(A) To provide a storage control sub-system whereby, even if an LU pair of large storage capacity is formed in order to create a snap shot, the wasted empty storage region is reduced.

(B) To provide a storage control sub-system whereby the possibility of confusion arising in the host terminal is reduced.

Other objects of the present invention will become apparent from the following description.

The storage control sub-system according to the present invention is a storage control sub-system of a storage control system connected to a host terminal, comprising: a logical storage device having a logical storage region for storing data in a logical fashion; a physical storage device, comprising the logical storage device, for storing the logically stored data, in a physical fashion; a virtual storage unit having a virtual storage region and being implemented in said storage control sub-system in a case where a virtual storage capacity value is established; a memory for storing the established virtual storage capacity value; and a storage control section. The storage control section creates an association (for example, a dynamic association) between a virtual storage region in the virtual storage unit and a logical storage region in the logical storage device if a read request or write request is received from the host terminal which recognizes the virtual storage unit, and it exchanges data between the logical storage region and the host terminal, by means of the virtual storage region. The storage control section reports the virtual storage capacity value stored in the memory, to the host terminal, and after the host terminal has stored the virtual storage capacity value, it is ensured that the reported virtual storage capacity value is not changed while the virtual storage unit is recognized by the host terminal.

The storage control method according to the present invention is a method implemented in a storage control sub-system, comprising, for example, a logical storage device having a f a logical storage region for storing data in a logical fashion; a physical storage device, comprising the logical storage device, for storing the logically stored data, in a physical fashion; a virtual storage unit having a virtual storage region and being implemented in said storage control sub-system in a case where a virtual storage capacity value is established; and a memory for storing the established virtual storage capacity value. This storage control method comprises the steps of: creating an association between a virtual storage region in the virtual storage unit and a logical storage region in the logical storage device if a read request or write request is received from the host terminal which recognizes the virtual storage unit; exchanging data between the logical storage region and the host terminal, by means of the virtual storage region; reporting the virtual storage capacity value stored in the memory, to the host terminal; and ensuring that, after the host terminal has stored the virtual storage capacity value, the reported virtual storage capacity value is not changed while the virtual storage unit is recognizes by the host terminal.

BRIEF DESCRIPTION OF THE DRAWINGS

FIG. 6 shows an example of the composition of an LU-LDEV management table 162b relating to the present embodiment;

FIG. 10 is a diagram showing one example of a storage control system management table 791;

DESCRIPTION OF THE PREFERRED EMBODIMENTS

Below, one embodiment of the present invention is described with respect to the drawings.

Figure 1:
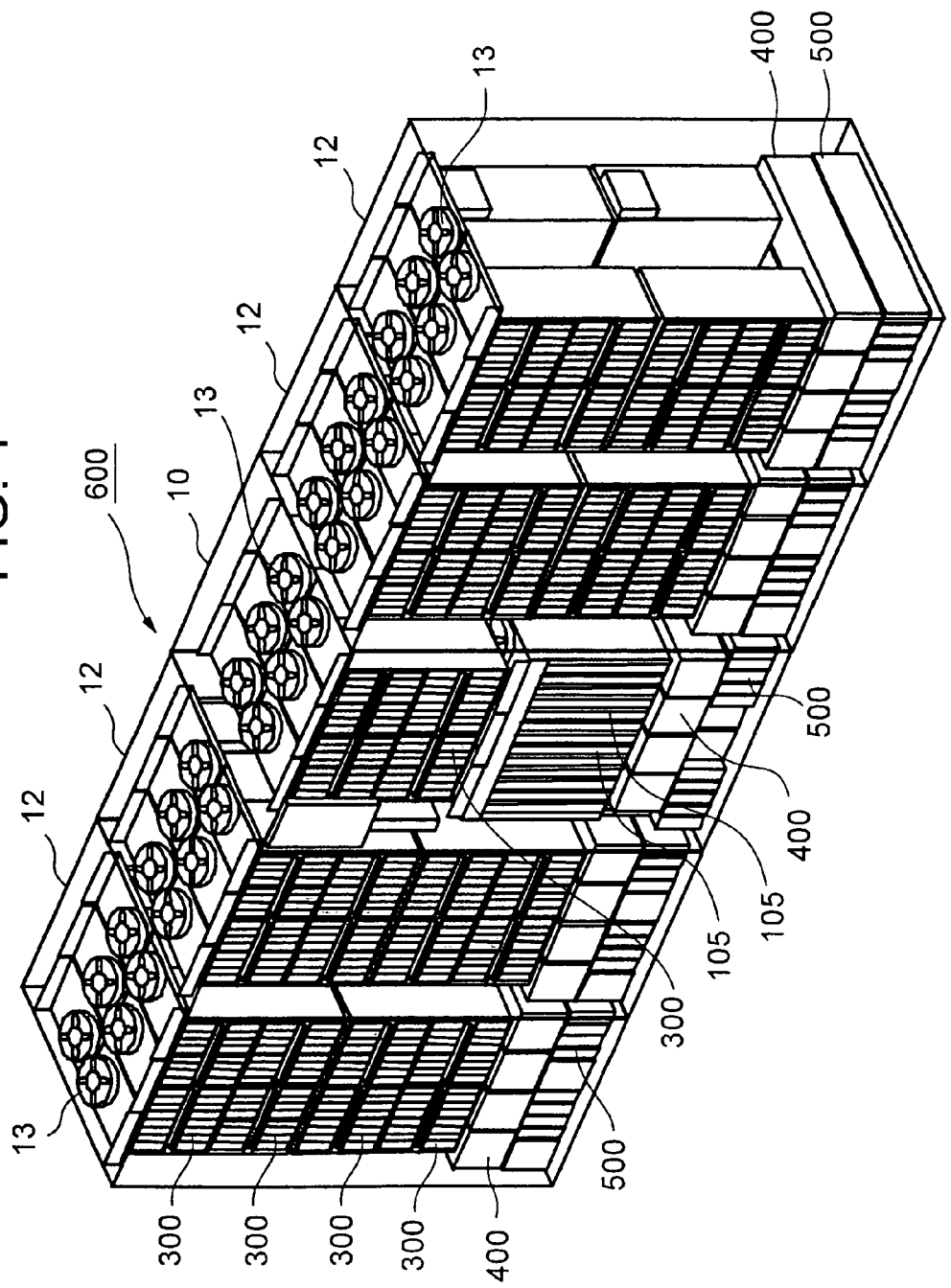
FIG. 1 shows a general view of the external appearance of a storage control system relating to one embodiment of the present invention.

FIG. 1 shows a general view of the external appearance of a storage control system relating to one embodiment of the present invention.

The storage control system 600 may be constituted by a base frame unit 10, and a plurality of add-on frame units 12 (although it may also be constituted by a base frame unit 11 only.).

The base frame unit 10 is the smallest compositional unit of the storage control system 600. Provided respectively in a detachable manner in this base frame unit 10 are, for example, a plurality of disk type storage devices (for example, hard disk drives (HDD)) 300, a plurality of control packages (for example, channel control sections or display control sections) 105, a plurality of power units 400, and a plurality of parity units 500. Furthermore, a plurality of cooling fans 13 are also provided in the base frame unit 10.

Each add-on frame 12 is an optional storage control system 600, for example, a maximum of four add-on frames 12 can be connected to any one base frame unit 10. Furthermore, a plurality of cooling fans 13 are also provided in each add-on frame unit 12. A plurality of disk type storage devices 300, a plurality of power supply units 400, and a plurality of parity units 500 are provided in a respectively detachable fashion, in each of the add-on frame units 12, these respective elements each being controlled by means of a control function of a control package 105 provided in the base frame unit 10.

Figure 2:
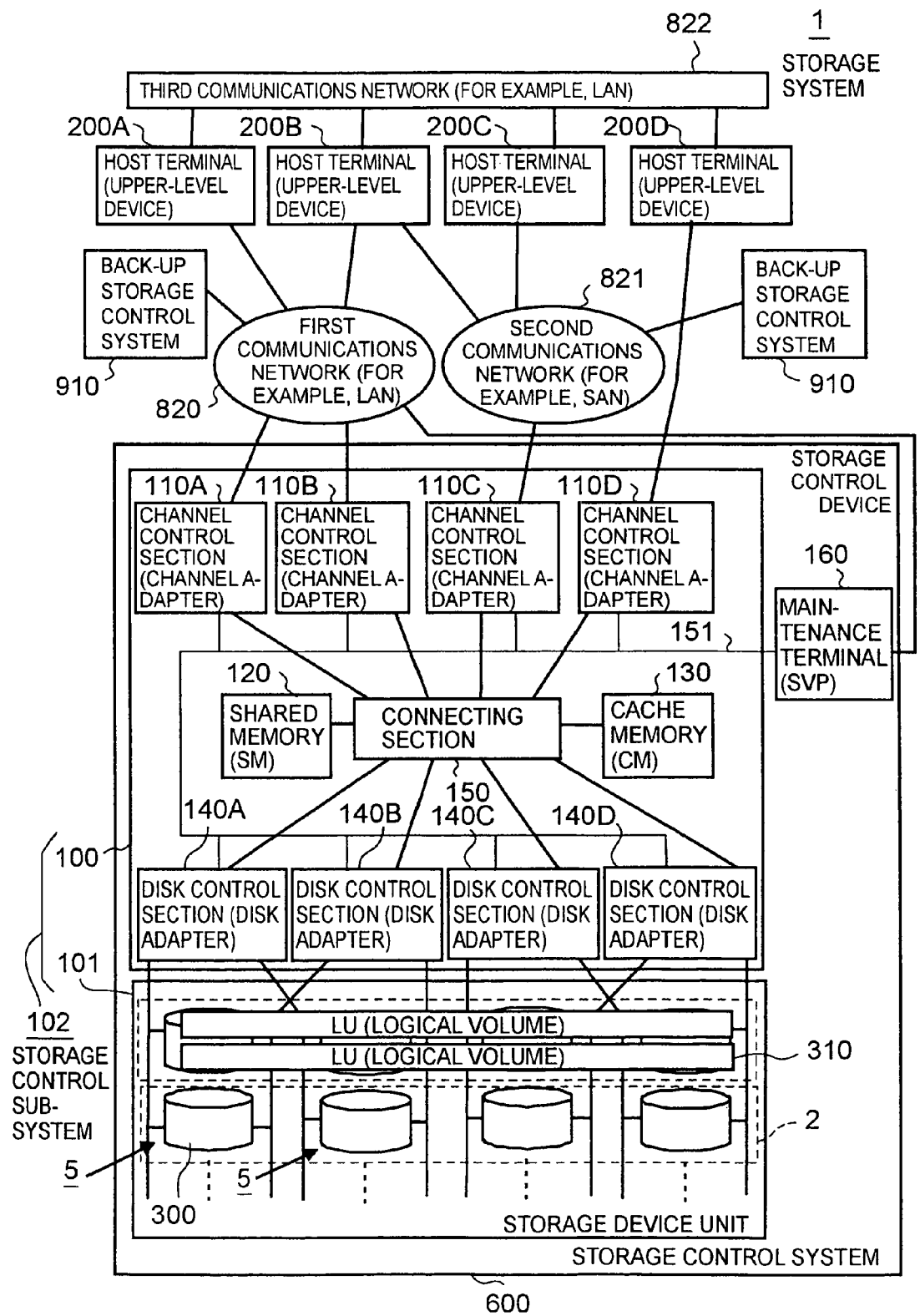
FIG. 2 shows a general view of a storage system relating to one embodiment of the present invention.

FIG. 2 shows a general view of a storage system relating to one embodiment of the present invention.

The basic compositional elements of this storage system 1 are one or a plurality of host terminals 200A-200D, and the storage control system 600.

Each of the host terminals (upper-level devices) 200A-200D is, for example, a computer system (for example, a personal computer or a workstation,) comprising a CPU (Central Processing Unit), a non-volatile and/or volatile memory (for example, a ROM or RAM), a hard disk, and the like, as hardware resources. The CPU in each of the host terminals 200A-200D performs combined processing involving computer programs and hardware resources (for example, the memory), and realizes various functions, by reading out and executing various computer programs stored in a memory. Each of the respective host terminals 200A-200D can be connected to the storage control system 600 by a variety of methods.

For example, the host terminals 200A-200B are connected to the storage control system 600 by means of a first communications network (for example, a LAN, Internet or dedicated circuit, hereinafter taken to be a LAN) 820. The communications between the host terminals 200A and 200B and the storage control system 600 performed via the LAN 820 are carried out in accordance with a TCP/IP protocol, for example. A data access request based on a file name indication (a data I/O request for a file unit, hereinafter referred to as a "file access request") is transmitted to the storage control system 600 by the host terminals 200A and 200B.

Moreover, for example, the host terminals 200B and 200C are connected to the storage control system 600 via a second communications network (for example, a SAN (Storage Area Network), hereinafter, taken to be a SAN) 821. The communications between the host terminals 200B and 200C and the storage control system 600 performed via the SAN 821 are carried out in accordance with a fiber channel protocol, for example. The host terminals 200B and 200C send data access request in block units, for example, (hereinafter called "block access requests"), to the storage control system 600 (a block unit is a block forming the management unit for data in the storage regions of the disk type storage device 300, described hereinafter.)

Furthermore, for example, the host terminal 200D is connected to the storage control system 600 without passing via a network, such as a LAN 820, SAN 821, or the like. The host terminal 200D may be taken to be a mainframe computer, for example. The communications between the host terminal 200D and the storage control system 600 are conducted in accordance with a communications protocol, such as FICON (Fiber Connection®), ESCON (Enterprise System Connection®), ACONARC (Advanced Connection Architecture®), FIBARC (Fiber Connection Architecture®), or the like. The host terminal 200D sends a block access request to the storage control system 600, in accordance with any one of these communications protocols, for example.

A back-up storage control system 910 is connected at least one of the LAN 820 and/or the SAN 821. The back-up storage control system 910 may be, for example, a storage control system for storing data on a disk type device selected from one or a plurality of disk type devices (for example, MO, CD-R, or DVD-RAM devices), or it may be a storage control system such as is the storage control system 600 described hereinafter, or it may be a storage control system storing data on a tape type device selected from one or a plurality of tape type devices (for example, DAT tape, cassette tape, open tape or cartridge tape). The back-up storage control system 910 receives data stored in the storage control system 600 via the LAN 820 or SAN 821, for example, (or furthermore, via a host terminal connected to the back-up control system 910), and it stores this data in the storage devices (for example, tape type devices) provided in same.

Furthermore, it is also possible for a management server 819 to be connected to at least the LAN 820, of the LAN 820 and the SAN 821. The management server 819 may, for example, relay communications between one host terminal and another host terminal, or communications between an host terminal and the storage control system 600.

Furthermore, the host terminals 200A-200D may be mutually interconnected by means of a third communications network (for example, a LAN).

The storage control system 600 is a RAID (Redundant Array of Independent Inexpensive Disks) system, for example. The storage control system 600 performs control in accordance with commands received from the host terminals 200A-200D. The storage control system 600 comprises a storage control sub-system (display device) 102, and a maintenance terminal (hereinafter, called a "Service Processor", or "SVP", for short) 160. The storage control sub-system 102 comprises a storage control device 100 and a storage device unit 101. The storage control device 100 comprises one or a plurality of channel control sections 110A-110D, one or a plurality of cache memories (hereinafter, referred to as "CM" as an abbreviation of "Cache Memory") 130, one or a plurality of shared memories (hereinafter, referred to as "SM" as an abbreviation of "Shared Memory") 120, one of a plurality of disk control sections 140A-140D, and a connecting section 150. The storage device unit 101 comprises one or more physical disk groups 5. Each of the respective one or more physical disk groups 5 comprises a plurality of disk type storage devices 300 disposed in an array fashion.

Each of the respective channel control sections 110A-110D may be constituted by a hardware circuit, software, or a combination of same. The respective channel control sections 110A-110D are installed detachably with respect to the storage control device 100 (for example, the base frame unit 10), and may also be called "channel adapters". The respective channel control sections 110A-110D are provided respectively with a printed circuit board on which a processor, memory, and the like, are mounted, and a control program stored in the memory, for example, and they achieve prescribed functions by means of combined operation of these hardware elements and software. The respective channel control sections 110A-110D are multi-layered (for example, in a dual layer), in such a manner that even if one channel control section breaks down, operation is continued by another channel control section. The channel control sections 110A-110D execute processing in accordance with commands received from a host terminal, while referencing the control information, and the like, in the SM 120 (for example, the LU-LDEV management table described hereinafter). Describing the operation of the channel control sections 110 in advance and taking the channel control section 110C as an example, from the channel control sections 110A-110D, and including the operation of the disk control sections 140A-140D, then when the channel control section 110C, for example, receives an I/O request containing a read request (an input/output request, in this case, a block access request) from the host terminal 200A or 200B, a read command is stored in the SM 120, and a cache region is guaranteed in the CM 130. The disk control sections 140A-140D refer occasionally to the SM 120, and if they discover an unprocessed read command, then they read out data from the disk type storage device 300 (typically, user data that is exchanged between the host terminals 200A-200D and the disk type storage device 300), and store this data in the aforementioned cache region guaranteed in the CM 130. The channel control section 110C reads out the data transferred to the CM 130, from the cache region, and sends this data to the host terminals 200A or 200B which originated the read request.

Moreover, for example, if the channel control section 110C receives an I/O request containing a write request from the host terminal 200B or 200C, then it stores the write command in the SM 120, guarantees a cache region in the CM 130, and then stores the data contained in the I/O request thus received, in the guaranteed cache region. Thereupon, the channel control section 110C reports write completion to the host terminal 200B or 200C which issued the write request. The disk control sections 140A-140D refer occasionally to the SM 120, and if they discover an unprocessed write command, then they read out the data from the guaranteed cache region in the CM 130, in accordance with this write command, and store this data a prescribed disk type storage device 300.

The aforementioned processing can also be carried out by one of the other channel control sections 110A-110B or 110D. The channel control sections 110A-110B perform the aforementioned processing after having converted a file access request to a block access request (for example, after converting the file name contained in a file request to a logical block address, in accordance with the file system employed therein).

Each of the respective disk control sections 140A-140D may be constituted by a hardware circuit, software, or a combination of same. The respective channel control sections 140A-140D are installed detachably with respect to the storage control device 100 (for example, the base frame unit 10 or an add-on frame unit 12), and may also be called "disk adapters". The disk control sections 140A-140D are provided respectively with a printed circuit board on which a processor, memory, and the like, are mounted, and a control program stored in the memory, for example, and they achieve prescribed functions by means of combined operation of these hardware elements and software. The respective disk control sections 140A-140D are multi-layered (for example, in a dual layer), in such a manner that even if one disk control section breaks down, operation is continued by another disk control section. The disk control sections 140A-140D control data communications between the respective disk type storage devices 300 contained in the respective physical disk groups 5, while referencing the control information, and the like, in the SM 120 (for example, an LU-LDEV management table as described hereinafter). The respective disk control sections 140A-140D and the respective disk type storage devices 300 are connected by means of a communications network, such as a SAN, for example, and perform data transfer in block unit, in accordance with a fiber channel protocol. Moreover, the disk control sections 140A-140D occasionally monitor the status of the disk type storage devices 300, and send this monitoring result to the SVP 160, by means of an internal communications network (for example, a LAN) 151.

The one or a plurality of CM 130 are volatile or non-volatile memories, for example. A cache region is guaranteed in the CM 130, and data exchanged between the channel control sections 110A-110D and the disk control sections 140A-140D is stored in the CM 130. It is also possible to provide multi-layered management of the data in a plurality of CM 130.

The one or a plurality of SM 120 are constituted by non-volatile memories, for example, and store control information (for example, the control information, and the like, may be managed in a multi-layered fashion, by means of a plurality of SM 120.) The control information contains, for example, various commands exchanged between the channel control sections 110A-110D and the disk control section 140A-140D, a cache management table, a disk management table, an LU-LDEV management table, and the like. The cache management table is, for example, a table which records the associative relationships between a cache region, and a logical address of an LDEV, as described hereinafter. The disk management table is a table for managing the respective disk type storage devices 300, and it comprises, for each disk type storage device 300, for example, a disk ID, a vendor, a storage capacity, a RAID level, and a use status (for example, whether or not the disk is in use or not in use), and the like. The LU-LDEV management table is a table for managing the LDEVs, described hereinafter, and it comprises, for each LDEV, for example, logical path information (for example, a port number, target ID and LUN), address management information (for example, an association between a physical address on the disk type storage device 300 and a logical address in the LDEV), a storage capacity, and a RAID level. The physical address is address information including, for example, the ID of the disk type storage device 300, a disk head number, and a number of sectors. The logical address is address information including, for example, a LUN (Logical Unit Number), an LDEV number, and a logical block address.

The connection section 150 provides a mutual connection between the respective channel control sections 110A-110D, the respective disk control sections 140A-140D, the CMs 130 and the SMs 120. Data and command are exchanged between the channel control sections 110A-110D, the CMs 130, the SMs 120 and the disk control sections 140A-140D, by passing via the connecting section 150. The connecting section 150 comprises, for example, a first subsidiary connecting section for transmitting user data, and a second subsidiary connecting section for transmitting control information, and the like. The first subsidiary connecting section is connected to the respective channel control sections 110A-110D and the respective disk control sections 140A-140D, and CMs 130, and the second subsidiary connecting section is connected to the respective channel control sections 110A-110D, the respective disk control sections 140A-140D, and SMs 120. Of the first subsidiary connecting section and the second subsidiary connecting section, at least the first subsidiary connecting section is a high-speed bus having, for example, an ultra-high-speed crossbar switch, or the like, for transmitting data by means of high-speed switching.

Each of the plurality of disk type storage devices 300 is, for example, a hard disk drive or semiconductor memory device, or the like. A RAID group 2 is constituted by a prescribed number of disk type storage devices 300, numbering two or more, of the plurality of disk type storage devices 300. The RAID group 2 is, for example, a group of disk type storage devices 300 based on a RAID principle, and may also be called a parity group or an error collection group. The two or more disk type storage devices 300 belonging to the same RAID group 2 are mounted on different motherboards, for example, thereby achieving a composition whereby even if one of the disk type storage devices 300 breaks down, the data of the disk type storage device 300 that has broken down can be recovered by means of the data in the other, remaining disk type storage device(s) 300. A plurality of LDEVs (Logical Devices), which are logical storage devices, are established on the physical storage region provided by this RAID group 2, and one or more of the LDEVs of this plurality of LDEVs is provided to the host terminals 200A-200D by the storage control device 100, as a single LU (Logical Unit) 310 having a LUN (Logical Unit Number). Each LU 310 may be paired as a primary LU (data copy source LU) with a separate LU 310 which forms a secondary LU (data copy destination LU), and in this case, all or a portion of the data in that LU 310 (for example, the data prior to update), is copied to the separate LU 310. Furthermore, each LU 310 may be paired as a secondary LU (data copy destination LU) with a separate LU 310 which forms a primary LU, and in this case, all or a portion of the data in the separate LU 310 (for example, the data prior to update), is copied to the LU 310 in question.

The SVP 160 is a computer system for maintaining and managing the storage system 600. The SVP 160 is able, for example, to gather information from the respective constituent elements of the storage control system 600 (for example, the channel control sections 110A-110D and the disk control sections 140A-140D), by means of a communications network 151, such as an internal LAN, or the like. More specifically, for example, the SVP 160 is able to receive fault generation information, by means of the OS (operating system), application program, drive software, and the like, mounted in the respective constituent elements of the storage control system 600 (for example, the channel control section or disk control section) outputting fault generation information relating to the occurrence of a fault in that constituent elements. The information received by the SVP 160 may be, for example, information relating to the device composition, a power supply alarm, a temperature alarm, the input/output speed (for example, the number of I/O requests received by the storage control device 100 during a prescribed time period), and the like. Furthermore, for example, the SVP 160 is able to established settings for the disk type storage devices 300 and settings for the LDEVs, and to install micro programs executed by the channel control sections 110A-110D, and the like, in response to operations performed by an operator. Moreover, the SVP 160 is also able to perform tasks, such as confirming the operational state of the storage control system 600, identifying the location of faults, and installing an operating system to be executed by the channel control section 110. The SVP 160 may also be connected to an external maintenance center (not illustrated), for example, by means of a communications network such as a LAN, telephone circuit, or the like, and it may report fault generation information, and the like, received from the respective constituent elements of the storage control system 600, to the external maintenance center. A mode may be adopted wherein the SVP 160 is built into the storage control system 600, or a mode may be adopted wherein it is fitted externally to same.

A basic description of the storage control system 600 was provided above. In this storage control system 600, for example, one channel control section and one disk control section are constituted integrally in a single module, and hence a single module may be used to provide the functions of a channel control section and a disk control section. Moreover, the SM 120 and CM 130 may also be constituted in an integral fashion, for example. One LUN may be allocated to each respective channel control section, or one LUN may be allocated to a plurality of channel control sections. Furthermore, a separate storage control system may also be connected to the storage control system 600. In this case, for example, a primary LU provided in the storage control system 600 and a secondary LU provided in the separate storage control system may be paired together, and the host terminals 200A-200D connected to the storage control system 600 may access the secondary LU inside the separate storage control system, via the storage control system 600. Furthermore, for example, the storage control system 600 may be able to receive both file access requests and block access requests, or it may be able to receive file access requests only (for example, NAS), or it may be able to receive block access requests only.

Figure 3:
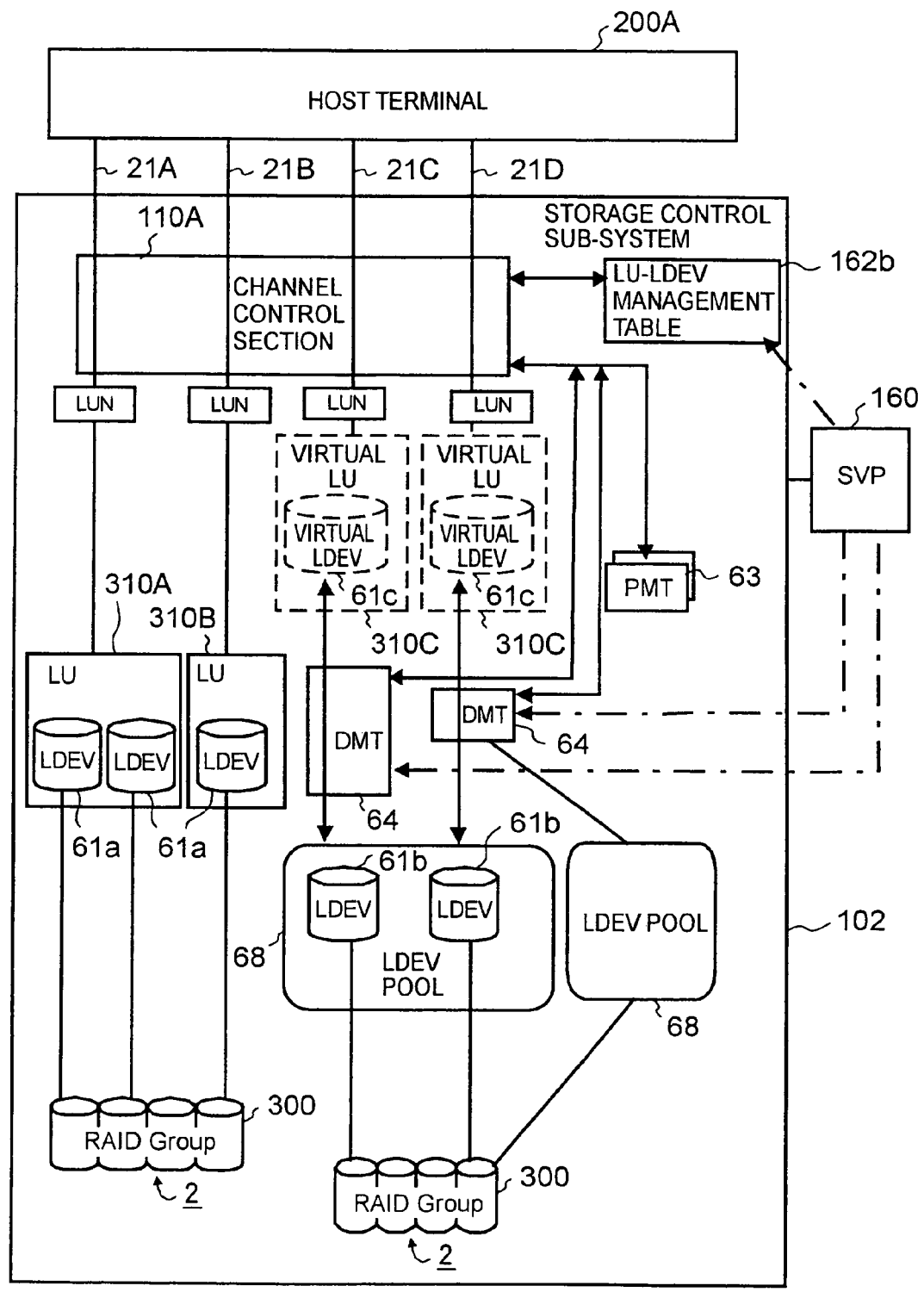
FIG. 3 is a block diagram showing the functions of a storage control sub-system relating to the present embodiment.

FIG. 3 is a block diagram showing the functions of a storage control sub-system 102 relating to the present embodiment. In the following description, in order to facilitate understanding of the explanation, the host terminal 200A is taken as an example, from the host terminals 200A-200D, and the channel control section 110A is taken as an example, from the channel control sections 110A-110D.

One or a plurality of logical communications paths (hereinafter, called "logical paths") 21A-21D are formed between the host terminal 200A and the storage control sub-system 102. Each logical path 21A-21D is formed on the basis of the number of a port in the storage control sub-system 102 (a port connected to the host terminal 100A), a target ID, and a LUN.

The plurality of LDEV provided on the one or a plurality of RAID groups 2 may be, for example, LDEVs having normal LDEV attributes (hereinafter, "normal LDEV") 61a, and LDEVs having pool LDEV attributes (hereinafter, "pool LDEV") 61b. Each LDEV can be changed from a normal LDEV 61a to a pool LDEV 61b, or conversely, from a pool LDEV 61b to a normal LDEV 61a, in accordance with instructions from the operator of the SVP 160.

A normal LDEV 61a is an LDEV which can be accessed by the host terminal 110A. In other words, for example, if the LUN of a logical path 21A is specified by the host terminal 110A, then the two normal LDEVs 61a associated with that LUN are provided to the host terminal 200A, as an LU 310A. Moreover, for example, if the LUN of a logical path 21B is specified by the host terminal 110A, then the one normal LDEV 61a associated with that LUN is provided to the host terminal 200A, as an LU 310B.

Pool LDEVs 61b are LDEVs which are members of a LDEV pool 68 and cannot be accessed by the host. In other words, for example, the pool LDEVs 61b are not associated with a LUN that can be specified by the host terminal 200A, and even if a LUN is specified, the pool LDEVs 61b themselves cannot be offered to the host terminal 200A.

One or a plurality of virtual LUs 310C which are provided to the host terminal 200A are situated above the LDEV pool 68. The virtual LUs 310C are LUs that are provided to the host terminal 200A, but unlike the other LUs 310A, 310B, these are virtual LUs which do not have a physical data storage region in the RAID group 2. Stated more specifically, the virtual LUs 310C are constituted by virtual LDEVs 61c, but unlike the normal LDEVs 61a and the pool LDEVs 61b, these virtual LDEVs 61c do not have a physical data storage region on the RAID group 2. Each of the plurality of virtual addresses held by the virtual LDEVs 61c is associated, in a dynamic fashion, with a logical address selected from a plurality of logical addresses held by the pool LDEVs 68, by means of a dynamic map table (hereinafter, abbreviated to "DMT") 64, or that association is released and the logical address is released.

Figure 4:
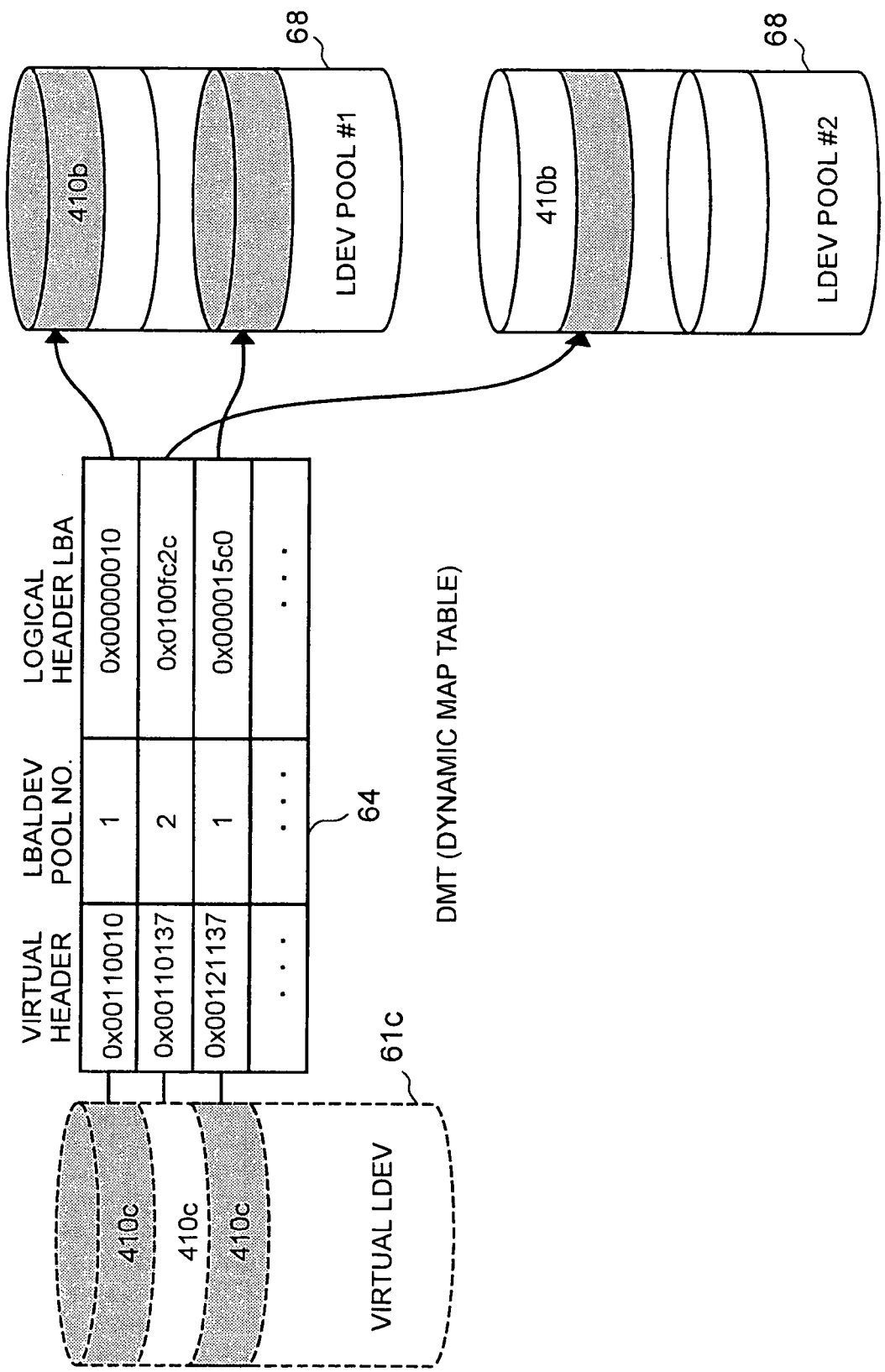
FIG. 4 shows an example of the composition of a virtual LDEV 61c, an LDEV pool 68, and a DMT 64.

FIG. 4 shows an example of the composition of a virtual LDEV 61c, an LDEV pool 68, and a DMT 64.

The virtual LDEV 61c comprises, for example, a plurality of virtual chunks 410c, 410c, . . . each having a uniform side (for example, 64 kilobytes). Each of the virtual chunks 410c is constituted by a prescribed number (for example, 128) logical blocks (of 512 bytes each, for example). Each virtual chunk 410c contains a header logical block address (hereinafter, abbreviated to "virtual header LBA"), in such a manner that the particular virtual chunk 410c can be identified from the virtual header LBA.

Each LDEV pool 68 is a group of one or more LDEVs 61b, being constituted, for example, by a plurality of logical chunks 410b, 401b having a uniform size (for example, 64 kilobytes). Each of the logical chunks 61b is constituted by a prescribed number (for example, 128) logical blocks (of 512 bytes each, for example). Each logical chunk 410b contains a header logical block address (hereinafter, abbreviated to "logical header LBA"), in such a manner that the particular logical chunk 410c can be identified from the logical header LBA. For example, if the logical header LBA to be accessed has been determined, then the number of the corresponding chunk is determined. More specifically, for example, if the logical chunk size is taken to be 64 kB (=128 blocks), then the logical chunk number n will be the integer portion of the logical block number m/128 (for example, the logical chunk number for the logical blocks of logical block number 0-127 will be zero, and the logical chunk number for the logical blocks of logical block number 128-255 will be 1).

The DMT 64 is registered in a storage region (for example, SM 120) inside the storage control sub-system 102, from an external terminal (for example, the SVP 160). A DMT 64 is prepared for each virtual LDEV 61c, and is a table for associating each virtual chunk 410c of that virtual LDEV 61c with a respective logical chunk 410b of the one or more LDEV pools 68. More specifically, for example, the DMT 64 contains, for each virtual header LBA, identification information for the LDEV pool 68 (for example, the LDEV pool number) associated with that virtual header LBA, and the logical header LBA in that LDEV pool 68. The contents of the DMT 64 are updated by the channel control section 110A, at a prescribed timing, for example, when the channel control section 110A has received an I/O request. The channel control section 110A updates the contents of the DMT 64 by referring to a pool management table (hereinafter, abbreviated to "PMT") 63.

Figure 5:
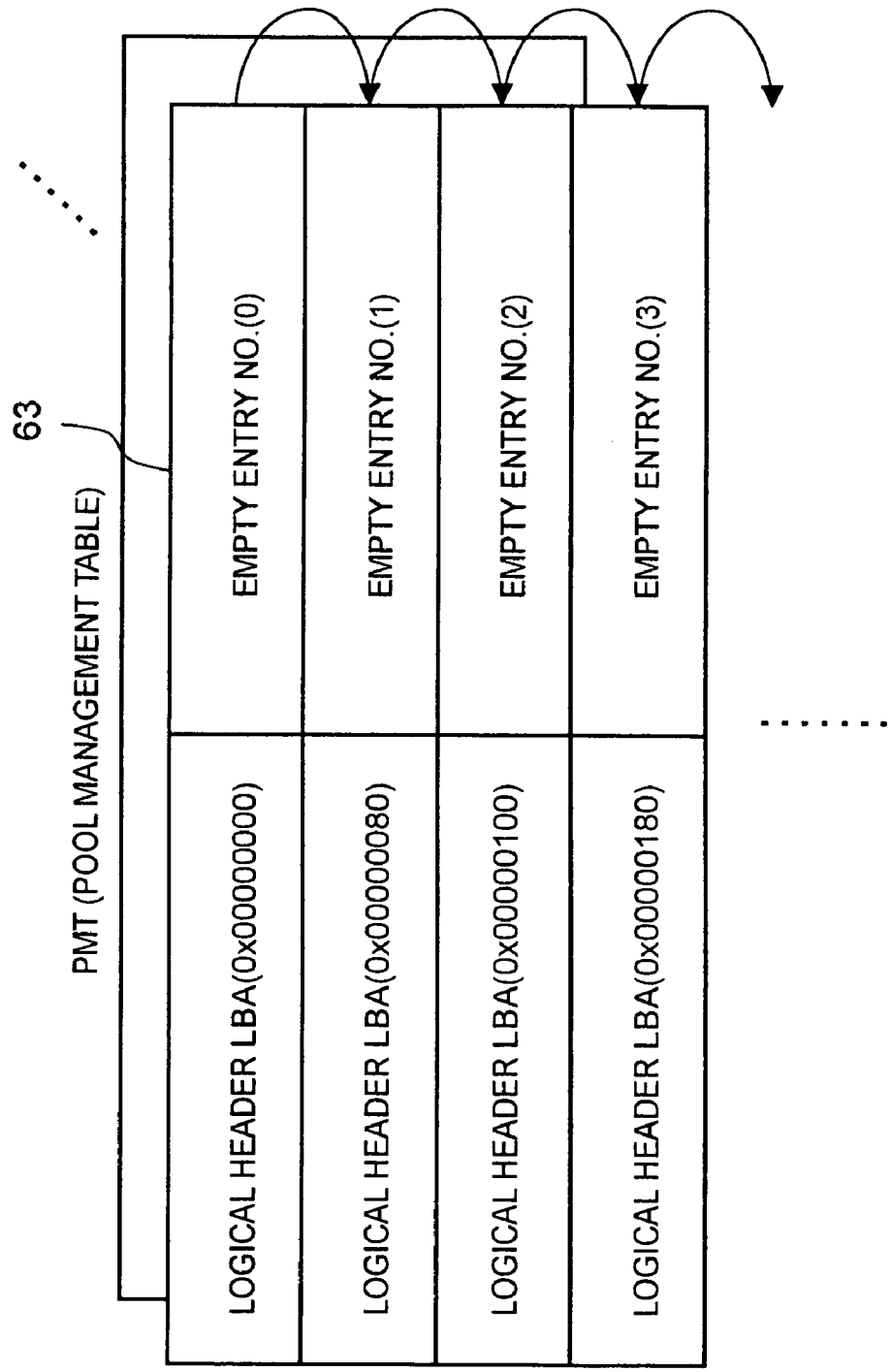
FIG. 5 shows an example of the composition of a PMT 63.

FIG. 5 shows an example of the composition of a PMT 63.

A PMT 63 exists for each of the LDEV pools 68, and is registered in a storage region inside the storage control sub-system 102 (for example, the SM 120), from an external terminal (for example, the SVP 160). An entry number is allocated to each logic chunk 401b of the LDEV pool 68. The other empty entry numbers are written into the respective PMTs 63, starting with the number of the first empty entry in the corresponding LDEV pool 68 (in other words, the chunk number having the most recent logical header LBA).

Below, the processing sequence implemented in the channel control section 110A for dynamically associating the virtual LDEVs 61c and the LDEV pools 68, will be described.

The host terminal 200A outputs an I/O request to the virtual LU 310C, by a similar method to that used to access the normal LU 310A. If the channel control section 110A has received an I/O request from the host terminal 110A, for example, then it creates an association between the virtual header LBA allocated to that I/O request and the logical header LBA of the LDEV pool 68. More specifically, for example, the channel control section 110A refers to the DMT 64 corresponding to the virtual LDEV 61c of the virtual LU 301C for which an I/O request has been received, and it acquires the LDEV pool number corresponding to the aforementioned virtual header LBA allocated to same. Thereupon, the channel control section 110A acquires the logical header LBA corresponding to the first empty entry number written to the PMT 63, from the PMT 63 corresponding to the LDEV pool number thus acquired, and registers the logical header LBA in the location corresponding to the virtual header LBA (the location on the DMT 64). Thereby, the logical header LBA is associated with the aforementioned virtual header LBA, and data can be read out from the logical chunk having that logical header LBA, or data can be written to that logical chunk.

Furthermore, after the processing based on the aforementioned I/O request has been completed, for example, the channel control section 110A can release the logical header LBA written to the DMT 64. More specifically, for example, the channel control section 110A erases the aforementioned logical header LBA registered in the DMT 64, from the DMT 64, and stores the logical header LBA and the entry number corresponding to same, in the PMT 63.

By means of a sequence of this kind, dynamic association and de-association is conducted between the virtual LUs 310C (virtual LDEVs 61c) and the LDEV pools 68. In this way, LDEV pools 68 are prepared which are constituted by pool LDEVs 61b, 61b, . . . that have not been previously allocated to be accessed by a particular host terminal, and the empty storage region in each LDEV pool 68 can be utilized effectively by associating the storage region of the LDEV pool 68 with a virtual LU 310C (virtual LDEV 61c).

FIG. 6 shows an example of the composition of an LU-LDEV management table 162b relating to this embodiment.

The LU-LDEV management table 162b is registered in a storage region inside the storage control sub-system 102 (for example, an SM 120). The LU-LDEV management table 162b registers, for example, for each port is provided in the storage control system 600 (each port connected to a host terminal), a port number, one or more target IDs belonging to that port number, LDEV information relating to one or more LUNs belonging to each target ID and the one or more LDEVs belonging to each LUN. The LDEV information for each LDEV contains, for example, the LDEV number, the storage capacity, RAID level, the aforementioned address management information, the LDEV attribute, the DMT-ID, LDEV group number, status and storage capacity report host ID.

The LDEV attributes may be the aforementioned pool LDEV, normal LDEV or virtual LDEV for example.

An LDEV having an LDEV attribute indicating "pool LDEV" (namely, a pool LDEV 61b as described above) cannot be accessed by a host terminal, and therefore no logical path information (for example, a LUN) is associated with the pool LDEV 61b. Furthermore, an LDEV pool number is associated with the pool LDEV 61b, in order that the LDEV pool 68 of which it is a member can be identified.

An LDEV having an LDEV attribute indicating "virtual LDEV" (namely, a virtual LDEV 61c as described above) is associated with an ID (for example, zero) of a DMT 64 corresponding to that LDEV 61c. By referring to this DMT-ID, it is possible to tell which DMT should be referenced in order to access which of the virtual LDEVs 61c (virtual LUs 310C). Furthermore, an LDEV pool number is associated with the virtual LDEV 61c, in order that the LDEV pool 68 of which it is a member can be identified.

An LDEV having an LDEV attribute indicating "normal LDEV" (namely, a normal LDEV 61a as described above) is not associated with a DMT-ID or LDEV group number.

The LDEV status may be, for example, "Ready" which indicates an accessible state (for instance, an installed state), or "Not Ready" which indicates a non-accessible state (for example, an uninstalled state).

The storage capacity report host ID for each LDEV is the ID of a host terminal which receives a report of the storage capacity of the LU belonging to the LDEV (for example, a MAC address or WWN (World Wide Name)). By referring to this ID, it is possible to tell to which of the host terminals the storage capacity of which LU is reported.

Figure 7:
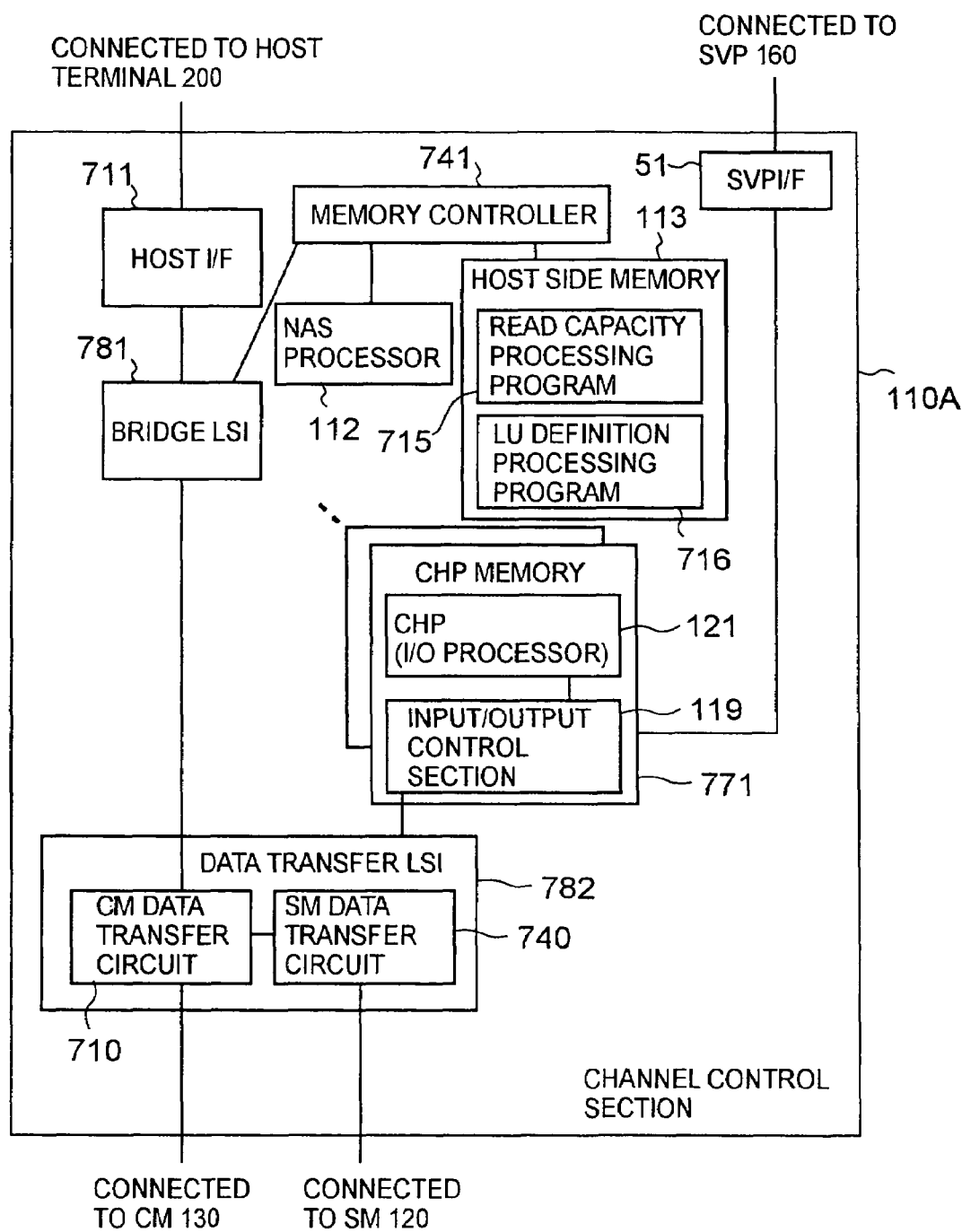
FIG. 7 shows an example of the composition of the channel control section 110A.

FIG. 7 shows an example of the composition of the channel control section 110A.

The channel control section 110A is constituted by a board in which hardware elements are formed into an integrated unit. The channel control section 110A may also be called a CHN (Channel adapter NAS), or a NAS blade. The channel control section 110A is provided with a board connector (not illustrated), and the channel control section 110A is connected electrically to the storage control device 100, by fitting this board connector into a prescribed connector on the storage control device 100. The channel control section 110A comprises a host interface section (hereinafter, abbreviated to "host I/F") 711, an SVP interface section (hereinafter, abbreviated to "SVP I/F") 51, a bridge LSI (Large Scale Integration) 781, a memory controller 741, a NAS processor 112, a host side memory 113, one or a plurality of input/output control sections 771 and a data transfer LSI 782.

The host I/F 711 is a communications interface for performing communications with the host terminals 200A and 200B, and receives file access requests transmitted by the host terminals 200A and 200B in accordance with a TCP/IP protocol, for example.

The SVP I/F 51 is connected to an SVP 160 via a communications network, such as an internal LAN 150, or the like, and is connected to a CHP 119, as described hereinafter. The SVP I/F 51 is a communications interface for controlling communications between the SVP 160 and the CHP 119 (for example, a LAN controller).

The bridge LSI 781 is, for example, an LSI for enabling communications between the host I/F 711, the memory controller 741, and the data transfer LSI 782.

The memory controller 505 is an LSI for enabling communications between the bridge LSI 782, NAS processor 112 and host side memory 113.

The NAS processor 112 is a CPU, for example, which performs control by means of a NFS (Network File System), in order that the storage control sub-system 600 functions as a NAS. For example, the NAS processor 112 identifies the associative relationship between a file name and a logical block address, by means of the NFS, or the like, and converts the file access request to a block access request on the basis of the file name contained in the file access request received by the channel control section 110A, and the aforementioned association, and outputs the converted request to the CHP 121.

Various programs and data are stored in the host side memory 113, for example. More specifically, for example, a file metadata table, a lock table, and NAS manager data and programs, and the like, as described hereinafter, are stored in the host side memory 113.

Each of the input/output sections 771 is a device (for example, a microprocessor unit), which sends and receives data and commands to and from the disk control sections 140A-140D, the CM 130, the SM 120 and SVP 160. Each of the input/output control sections 771 comprises a CHP (channel processor) 121 and a CHP memory 119.

The CHP 121 is, for example, a microprocessor, which performs overall control of the whole channel control section 110A, as well as controlling communications with the disk control sections 140A-140D, the host terminals 200A and 200B, and the SVP 160. The CHP 121 provides the function of a channel control section 110A, by executing various computer programs stored in the CHP memory 121 (or the host side memory 113).

The CHP memory 119 is a volatile or non-volatile memory (for example, a NVRAM), and stores, for example, computer programs for controlling the CHP 121. The contents of the programs stored in the CHP memory 119 can be written, and rewritten, in accordance with instructions from the SVP 160, or the NAS manager 806 described hereinafter.

The data transfer LSI 501 is an LSI for controlling data transfer. More specifically, the data transfer LSI 501 comprises, for example, a CM data transfer circuit 710 and an SM data transfer circuit 740. The CM data transfer circuit 710 is connected to the CM 130 and inputs and outputs user data. The SM data transfer circuit 740 is connected to the SM 120 and inputs and outputs control information.

The host side memory 113 described above (or the CHP memory 121) stores, for example, a read capacity processing program 715 and an LU definition processing program 716.

Upon receiving a read capacity command from the host terminal 200A, the read capacity processing program 715 acquires the storage capacity of the LU corresponding to the port number, target ID and LUN for which the read capacity command was received, from the LU-LDEV management table 162b, and it reports that storage capacity to the host terminal 200A which issued the read capacity command.

The LU definition processing program 716 provides an LU setting screen to the SVP 160, in response to access from the SVP 160, and updates the LU-LDEV management table 162b on the basis of the information input to this LU settings screen.

At least one of the read capacity processing program 715 and the LU definition processing program 716 does not necessarily have to be stored in the channel control section 110A, and for example, it may be stored in a separate location, such as a memory provided in the disk control sections 140A-140D.

Figure 8:
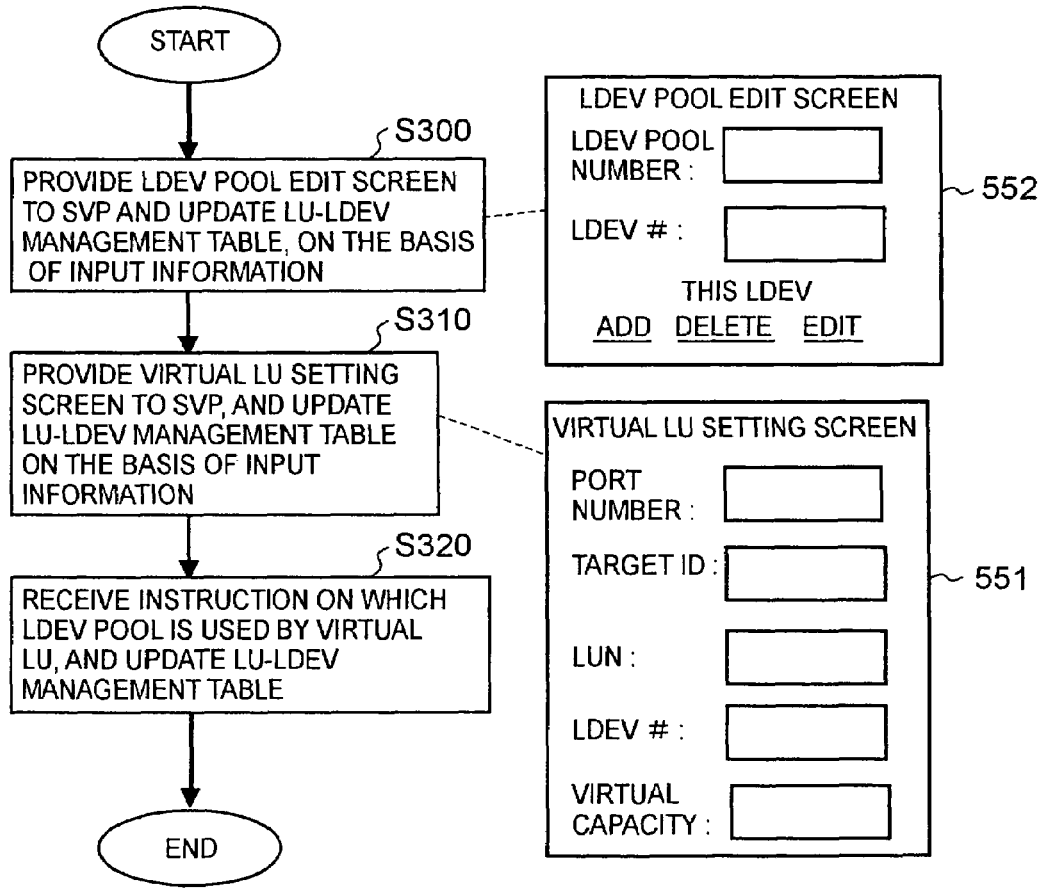
FIG. 8 shows the processing sequence implemented by the storage control sub-system 102 when an LU is established.

FIG. 8 shows the processing sequence implemented in the storage control sub-system 102 when an LU is established.

The processing in this diagram is executed by the channel control section 110A, for example.

The channel control section 110A receives an LDEV pool creation request from the SVP 160 (or from an external terminal connected to same). The channel control section 110A provides an LDEV pool editing screen 552 to the SVP 160, in response to this request. This screen 552 comprises an input column for the LDEV pool number to be created, and an LDEV number input column for adding, deleting or editing LDEV numbers, to or from the LDEV pool. Furthermore, a tool is also provided on the screen 552 for accepting a selection for implementing an addition, deletion or edit of an LDEV number input to the LDEV number column, for example.

The channel control section 110A creates (or edits) an LDEV pool (in other words, it updates the LU-LDEV management table 162b) in accordance with information input to the LDEV pool editing screen 552 (S300).

Thereupon, the channel control section 110A receives selection for defining either a virtual LU or a normal LU, from the SVP 160, and if a virtual LU is selected, then a virtual LU setting screen 551 is provided to the SVP 160. This screen 551 contains input boxes for the port number, target ID, LUN, LDEV number and virtual storage capacity, corresponding to that virtual LU.

The channel control section 110A defines a virtual LU in accordance with information input to the virtual LU setting screen 551 (in other words, it registers information relating to a new virtual LDEV having an LDEV attribute indicating "virtual LDEV", in the LU-LDEV management table 162b) (S310).

Furthermore, the channel control section 110A receives an indication of which LDEV pool is to be used for the virtual LU defined in step S310, (for example, it receives input of an LDEV pool number), and associates the LDEV pool thus specified with the virtual LU (virtual LDEV) (in other words, it registers the input LDEV pool number in the LU-LDEV management table 162b) (S320).

By means of the foregoing sequence, the definition of the virtual LU (virtual LDEV) is completed. The virtual storage capacity entered here is reported to the host terminal 200A, in response to a read capacity command from the host terminal 200A.

Figure 9:
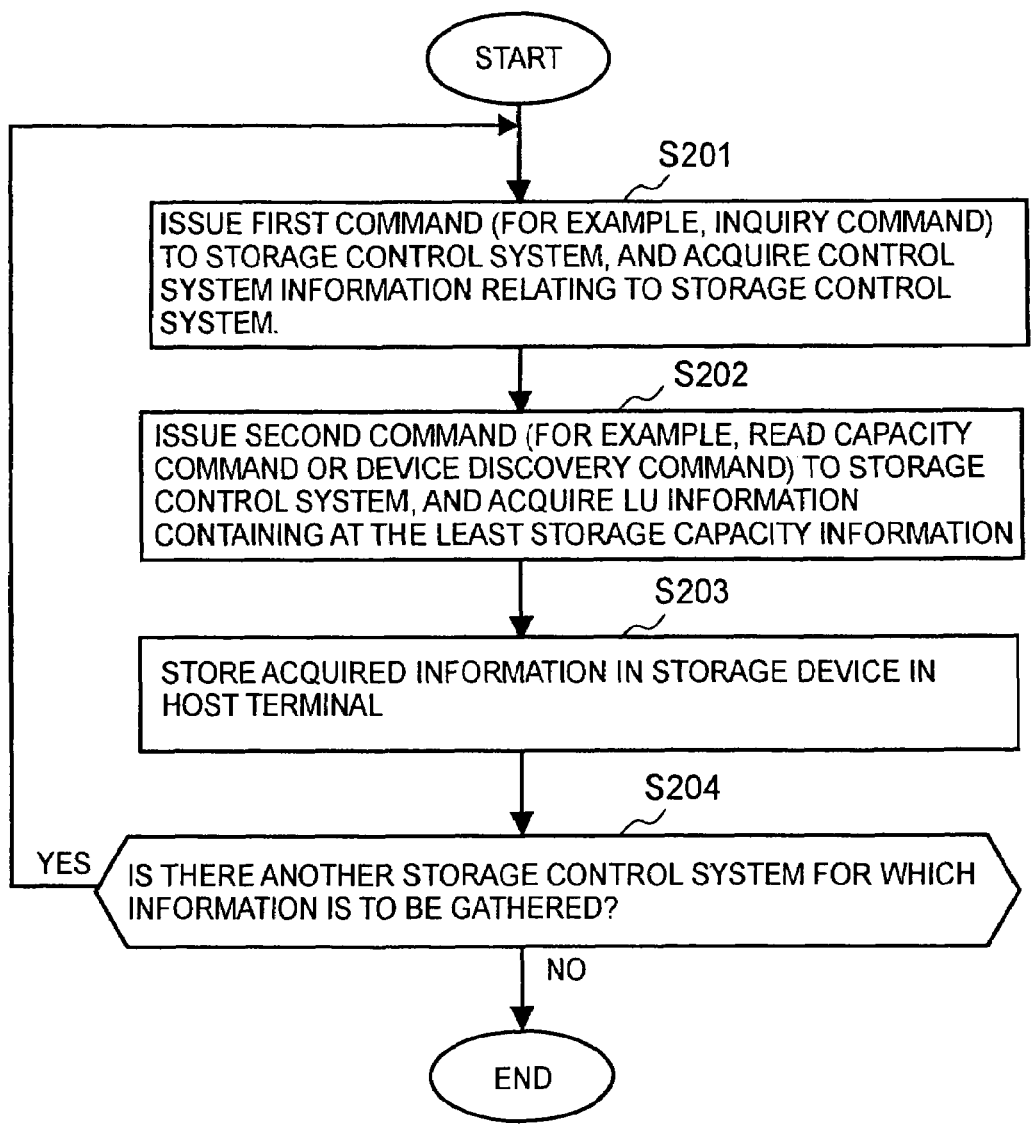
FIG. 9 shows one example of the processing flow of the host terminal 200A.

FIG. 9 shows one example of the processing flow of the host terminal 200A.

If the host terminal 200A executes restart processing, for example, or if it executes rescan processing for investigating all of the storage control systems 600 connected to the host terminal 200A, then the following processing sequence is executed.

For example, the host terminal 200A issues a first command (for example, an Inquiry command) to the storage control system 600, and it receives from the storage control system 600, the control system information relating to that storage control system 600 (for example, the vendor name and model name of the storage control system 600) (S201).

Thereupon, the host terminal 200A issues a second command to the storage control system 600 (for example, a device discovery command or a read capacity command), and receives from the storage control system 600 the LU information relating to all of the LUs provided by that storage control system 600 to the host terminal 200A (S202). The LU information thus received contains, at the least, storage capacity information, for example, for each of the LUs accessible by the host terminal 200A, and it may also contain the path of the LU (for example, the port number, target ID and LUN), the vendor of the disk type storage device having the LDEV belonging to that LU, and the like.

The host terminal 200A stores the control system information received at S201, and the LU information received at S202, in a storage device (for example, a hard disk drive) of the host terminal 200A (S203). For example, the host terminal 200A creates and stores a storage control system management table 791 such as the example illustrated in FIG. 10, for each storage control system 600, on the basis of the LU information received at S202. The port number, target ID, LUN, vendor, model and storage capacity, and the like, are registered for each LU, in the storage control system management table 791. If the LU is a virtual LU, then the storage capacity received in S202 is the value input via the virtual LU setting screen 551 (in other words, any value desired by the operator).

The host terminal 200A executes the processing in S201 to S203 for all of the storage control systems 600 (N at S204).

Figure 11:
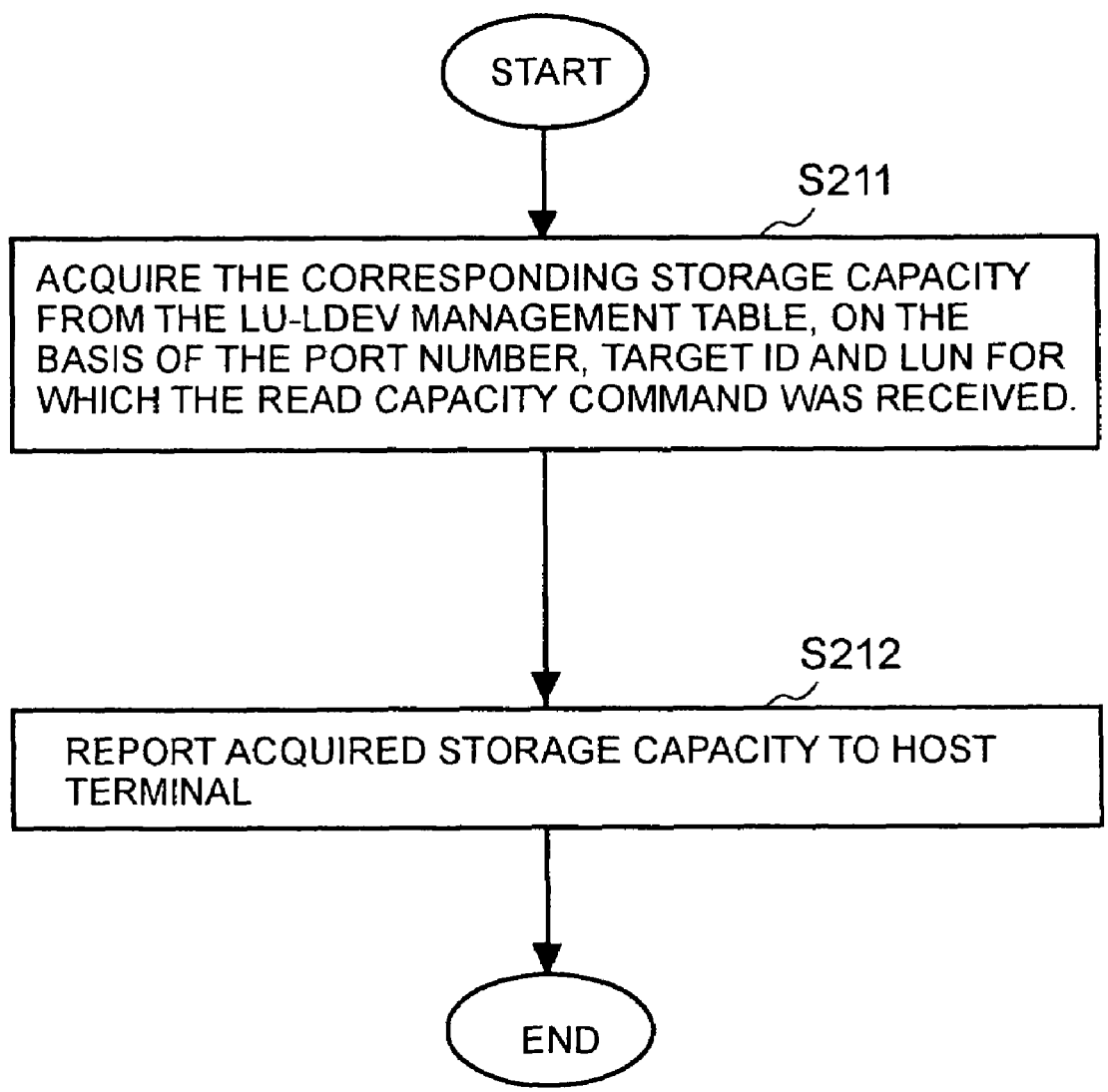
FIG. 11 shows one example of the processing flow implemented by the channel control section 110A in a case where a read capacity command is received from the host terminal 200 as a second command.

FIG. 11 shows one example of the processing flow implemented by the channel control section 110A in a case where a read capacity command is received from the host terminal 200 as a second command.

If the channel control section 110A has received a read capacity command from the host terminal 200A, then it acquires the storage capacity corresponding to the port number, target ID and LUN for which the read capacity command has been received, from the LU-LDEV management table 162b (S211), and reports this storage capacity to the host terminal 200A (S212). Furthermore, the channel control section 110A writes the host ID of the report destination host terminal 200A, to the LU-LDEV management table 162b.

In the foregoing description, in order to facilitate understanding of the explanation, the channel control section 110A and the host terminal 200A were taken as examples, but the foregoing description also applies to the other channel control sections 110B-110D, the disk control sections 140A-140D, and the other host terminals 120B-120D.

In the present embodiment, moreover, the following characteristic processing is carried out, for example. The following description may overlap with the foregoing description, but it describes a number of characteristic processes.

(1) First Characteristic Process

Figure 12:
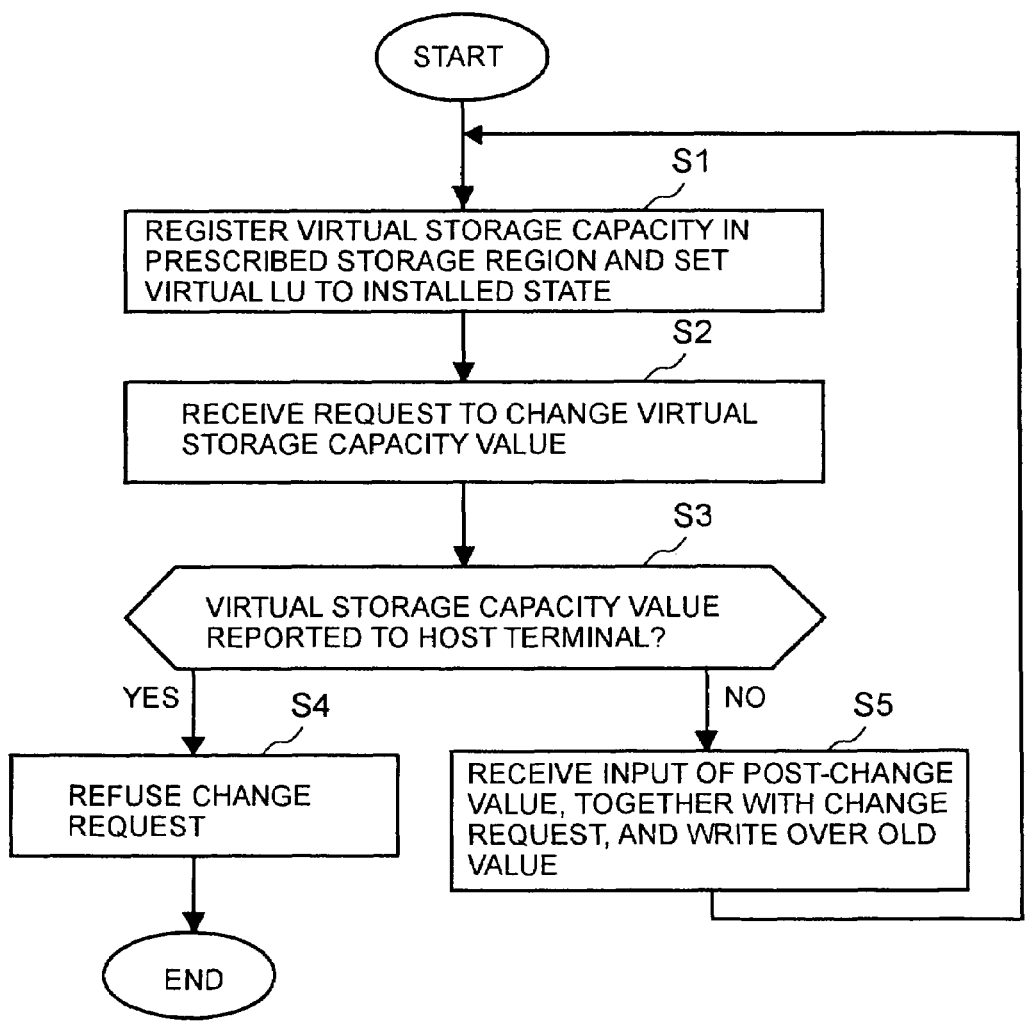
FIG. 12 shows a first processing sequence relating to a first characteristic process according to the present embodiment.

FIG. 12 shows a processing sequence relating to a first characteristic process

If the storage control device 100 of the storage control sub-system 102 (for example, the channel control section or the disk control section), has registered a virtual storage capacity for a virtual LU 310C in a prescribed storage region (for example, the SM 120), then it is taken that the virtual LU 310C is in an installed state (in other words, the virtual LU 310C is accessible by the host terminal) (S1).

If the storage control device 100 has received a request to change the virtual storage capacity value, from the SVP 160 (or another external terminal) (S2), then it judges whether or not the virtual storage capacity value registered at S1 has been reported to the host terminal (S3). More specifically, for example, the storage control device 100 refers to the LU-LDEV management table 162b, and judges whether or not a report host ID has been registered in correspondence with the storage capacity value subject to the update request.

If the result of S3 is an affirmative judgment result (Y at S3), then the storage control device 100 rejects the storage capacity value change request (S4) from the SVP 160. In other words, the storage control device 100 prohibits changing of the virtual storage capacity value, if the virtual storage capacity value has already been reported to an host terminal in the past.

If, on the other hand, as a result of S3, a negative judgment result is obtained (N at S3), then storage control device 100 receives a storage capacity value change request from the SVP 160, and inputs the changed virtual storage capacity value, from the SVP 160, which it writes over the existing virtual storage capacity value in the prescribed storage region (S5).

By means of the foregoing processing, if there is a possibility that a virtual storage capacity value has been reported to the host terminal already in the past, and that that virtual storage capacity value has been stored in the host terminal, then if a different virtual storage capacity value is reported to the host terminal with respect to the same virtual LU, control is performed whereby it is possible to avoid confusion in the host terminal in question.

(2) Second Characteristic Process

The storage control device 100 registers the virtual storage capacity value established as desired by the operator, in a prescribed storage region, and when it receives a second command from the host terminal, it reports the desired value established by the operator, to the host terminal, in response to that command.

(3) Third Characteristic Process

Figure 13:
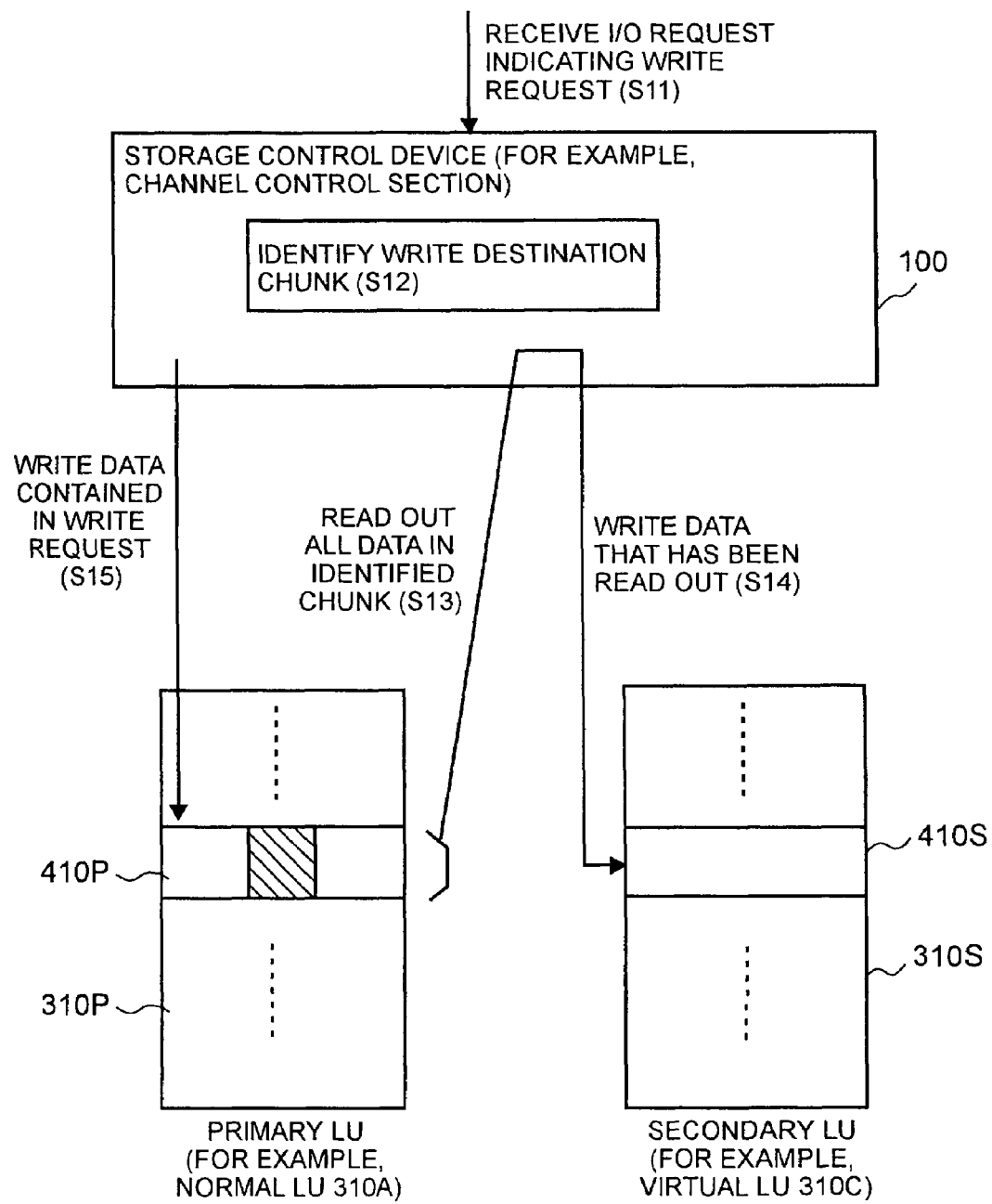
FIG. 13 shows a composition and processing sequence relating to a third characteristic process.

FIG. 13 shows a composition and processing sequence relating to a third characteristic process.

The storage control device 100 forms an LU pair comprising two LUs, one LU being a primary LU 310P and the other LU being a secondary LU 310S, in such a manner that a snap shot is carried out to copy the data in the primary LU 310P to the secondary LU 310S.

More specifically, for example, the storage control device 100 forms an LU pair by setting a normal LU 310A to be the primary LU 310P and a virtual LU 310C to be the secondary LU 310S, either manually upon request from the external terminal (for example, the SVP 160), or automatically, if an I/O request indicating a write request is received (S11).

Thereupon, the storage control device 100 identifies a write destination chunk (for example, a header LBA) 410P in a normal LU 310A, from the received write request (S12). Even if only a portion of the data in the identified chunk 410P (the portion indicated by the diagonal shading) is to be updated, the storage control device 100 reads out all of the data in the chunk 410P (S13), and then writes that data to the virtual LU 310C (S14). More specifically, as described previously, the storage control device 100 associates the virtual chunks 410S in the virtual LU 310C with the logical chunks in the LDEV pool 68, in a dynamic fashion, and it writes the data to the LDEV chunk that is associated with the virtual chunk 410S.

In this way, after creating a snap shot, the storage control device 100 writes the data contained in the write request received at S11, to the chunk 410P identified above (S15).

In the aforementioned processing sequence, when forming an LU pair, the storage control device 100 refers to the LU-LDEV management table 162b and forms an LU pair only if the primary LU 310P and the secondary LU 310S have matching storage capacity values, and if these values are not matching, then it may refuse to form an LU pair.

If the primary LU 310P and the secondary LU 310S do not have the same storage capacity value, and it is not possible to form an LU pair, then if the storage capacity of the primary LU 310P is large, the storage capacity of the secondary LU 310S must also be large. However, in creating a snap shot, the data size copied from the primary LU 310P to the secondary LU 310S may be smaller than the capacity of the primary LU 310P. If, despite this, a normal LU 310A of large capacity is used as a secondary LU 310S, then it can be envisaged that a large, wasted empty storage region will be created.

However, as described above, in creating a snap shot, by forming an LU pair using a virtual LU 310C as the secondary LU 310S, the empty region of the LDEV pool 68 which can be associated with that virtual LU 310C is associated with other virtual LUs 310C, in a dynamic fashion, and therefore, it is possible to prevent the occurrence of wasted, empty storage regions.

(4) Fourth Characteristic Process

Figure 14:
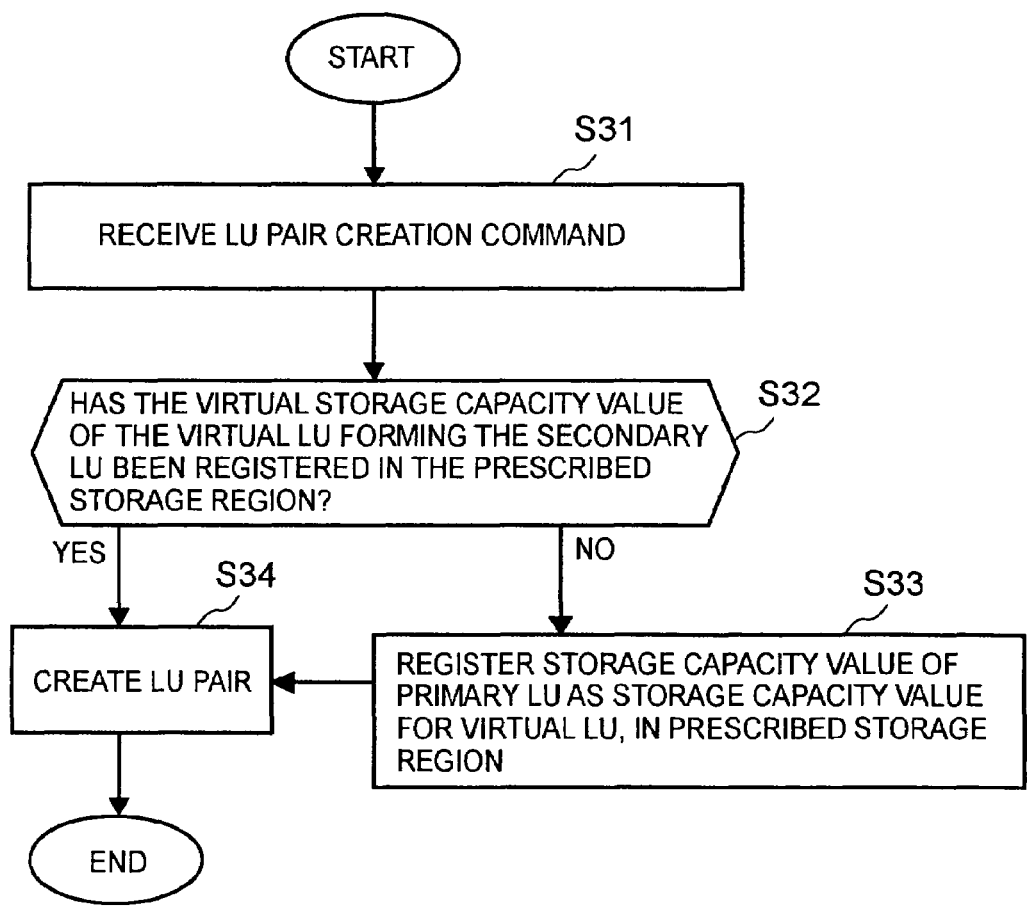
FIG. 14 shows a processing sequence relating to a fourth characteristic process according to the present embodiment.

FIG. 14 shows a processing sequence relating to a fourth characteristic process.

The storage control device 100 prepares a virtual LU 310C which does not have a virtual storage capacity value, for example.

Thereupon, when the storage control device 100 has received an LU pair creation command from an external terminal (for example, the SVP 160) (S31), it judges whether or not the virtual storage capacity value of the virtual LU 310C forming the secondary LU 310S specified by that LU pair creation command is registered in the prescribed storage region, (for example, whether or not the storage capacity value has been registered in the LU-LDEV management table 162b) (S32).

If the result of S32 is an affirmative judgment result (Y at S32), then the storage control device 100 creates an LU pair in accordance with the LU pair creation command received at S31 (S34).

If, on the other hand, the judgment result at S32 is negative (N at S32), then the storage control device 100 registers the storage capacity value of the primary LU 310P specified by the aforementioned LU pair creation command (for example, a normal LU 310A or a virtual LU 310C), as a virtual storage capacity value, in the prescribed storage region (S33). Thereupon, the storage control device 100 executes the processing in S34.

(5) Fifth Characteristic Process

Figure 15:
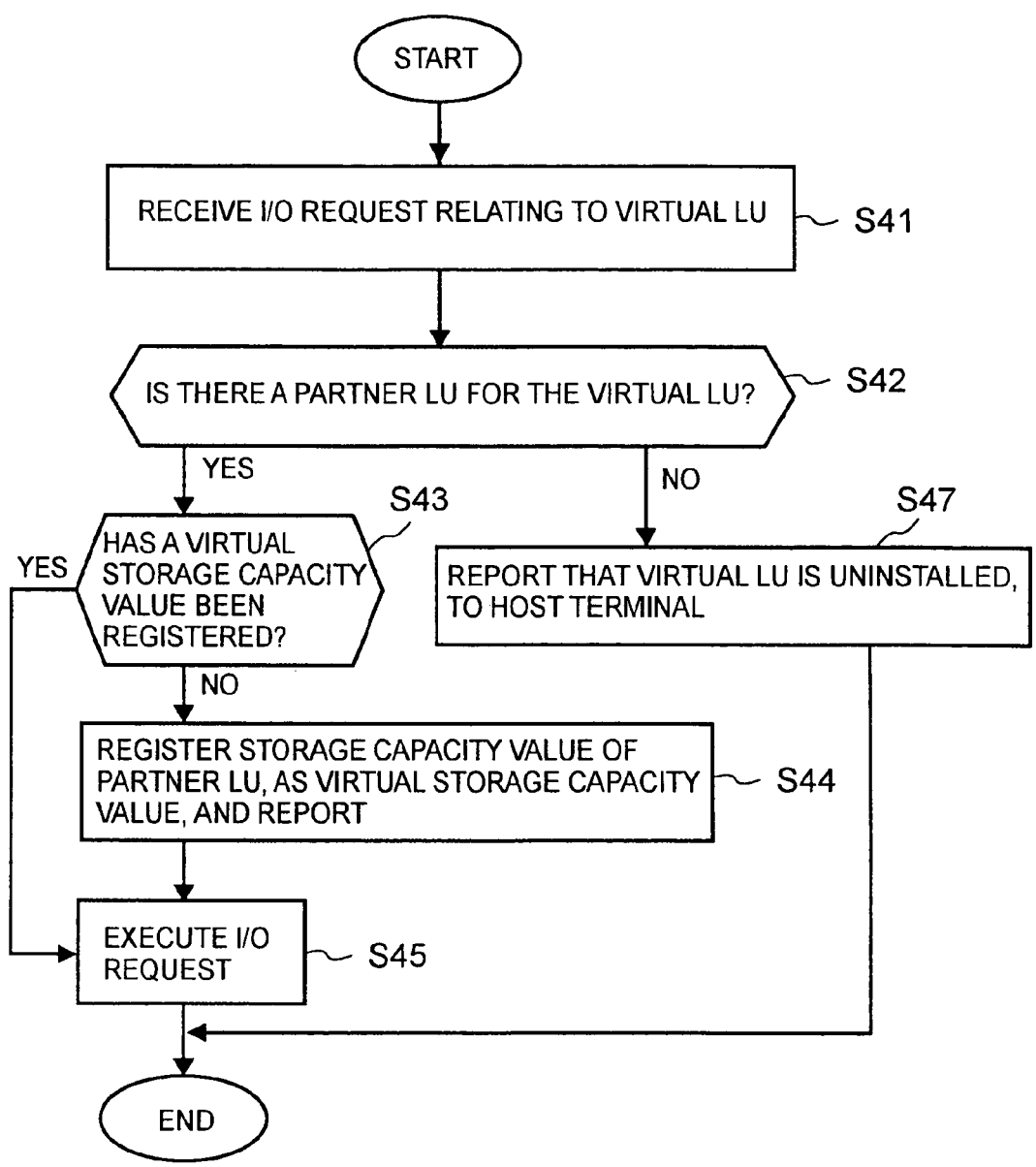
FIG. 15 shows a processing sequence relating to a fifth characteristic process according to the present embodiment.

FIG. 15 shows a processing sequence relating to a fifth characteristic process.

The storage control device 100 prepares a virtual LU 310C which does not have a virtual storage capacity value, for example. Moreover, the storage control device 100 manages the LU pair information relating to respective LU pairs (for example, the LUN of each LU constituting an LU pair), in the prescribed storage region (for example, the SM 120).

If the storage control device 100 has received an I/O request relating to a virtual LU 310C of this kind (S41), then it refers to the aforementioned LU pair information and judges whether or not there exists a paired partner for that virtual LU (S42).

If the result of S42 is a negative judgment result (N at S42), then the storage control device 100 reports to the host terminal issuing the I/O request that the LU is not installed (S47), whereupon it terminates the process. Thereupon, when a partner LU for that virtual LU is subsequently established, the storage control device 100 registers the storage capacity value for the partner LU, as a virtual storage capacity value for the virtual LU, in the prescribed storage region, at a prescribed timing (for example, when the partner LU has been established). Furthermore, the host ID of a host terminal may be stored as a destination for the LU not installed report, and when a virtual storage capacity value is registered, the storage control device 100 may report that virtual storage capacity value to the host terminal corresponding to the host ID.

On the other hand, if the result of S42 is an affirmative judgment result (Y at S42), then the storage control device 100 judges whether or not a virtual storage capacity value has been registered in the prescribed storage region (S43).

When an affirmative result is obtained for the judgment step in S43 (Y at S43), the storage control device 100 executes processing in accordance with the I/O request received at S41 (S45).

If, on the other hand, a negative result is obtained as a result of the judgment step in S43 (N at S43), then the storage control device 100 registers the storage capacity value of the partner LU of the virtual LU, in the prescribed storage region, and furthermore, it reports that virtual storage capacity value to the host terminal which issued the I/O request (S44). Thereupon, the storage control device 100 executes the processing in S45.

(6) Sixth Characteristic Process

Figure 16:
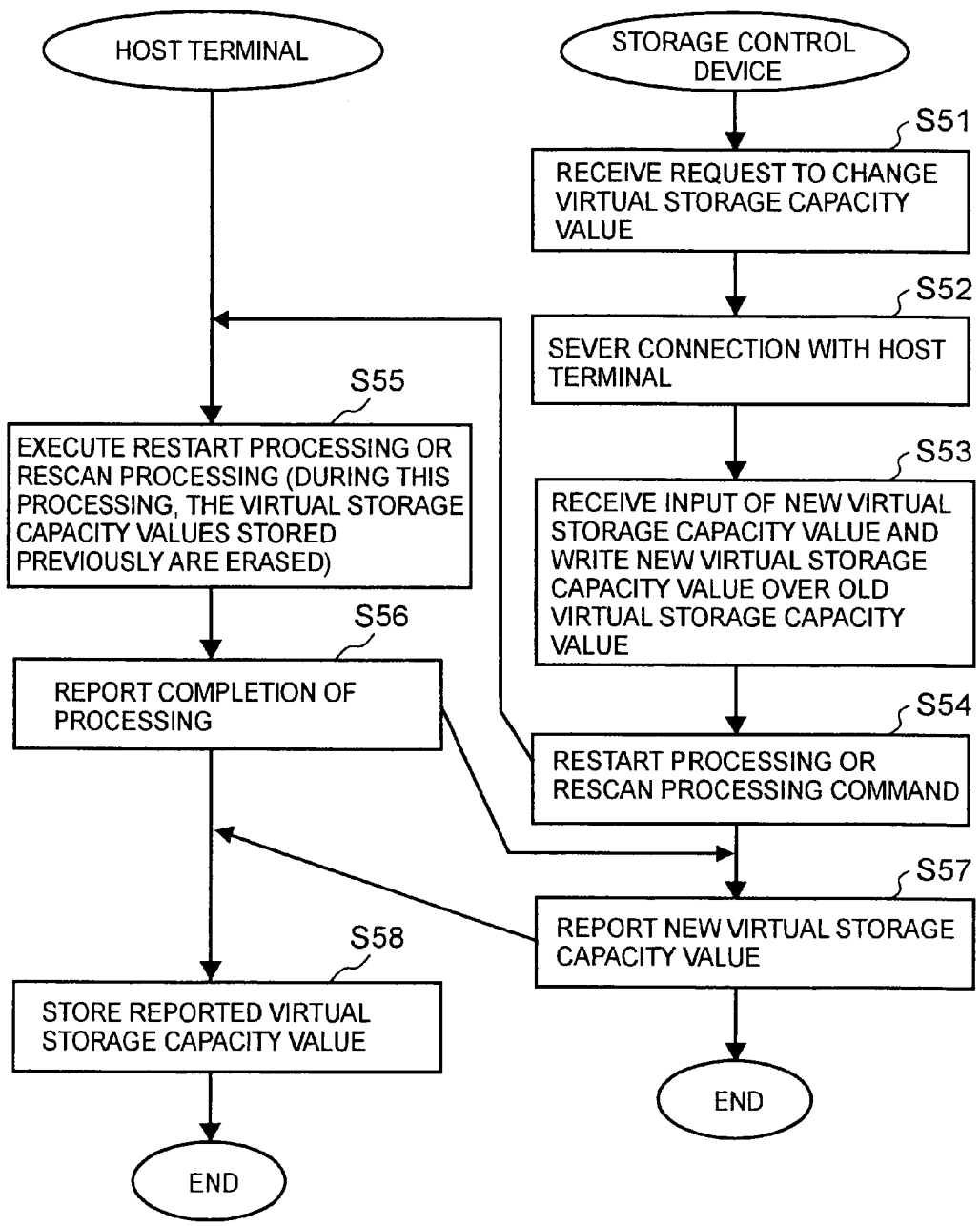
FIG. 16 shows a processing sequence relating to a sixth characteristic process according to the present embodiment.

FIG. 16 shows a processing sequence relating to a sixth characteristic process.

If the host terminal executes prescribed processing, for example, restart processing, or if it executes rescan processing for investigating all of the storage control systems 600 connected to that host terminal, then previously stored information (for example, the actual management table of the storage control system itself) is erased.

If the storage control device 100 has received a request to update a virtual storage capacity value, from an external terminal (such as the SVP 160), for example (S51), then it severs it connection with all of the host terminals which are able to access the virtual LU 310C having that virtual storage capacity value (in other words, it switches that virtual LU 310C, compulsorily, to an off-line state) (S52).

The storage control device 100 then receives input of a new virtual storage capacity value from the external terminal, and writes this new virtual storage capacity value over the old virtual storage capacity value (S53).

Thereupon, the storage control device 100 outputs a restart processing or rescan processing command to the host terminals with which the connection was severed (S54).

The host terminal having received the restart processing or rescan processing command executes restart processing or rescan processing in response to this command (S55). In this case, the host terminal erases the previously stored information (for example, the actual storage control system management table itself.

When the processing in S55 has been completed, the host terminal sends a processing complete report to the storage control device 100 (S56). In addition to, or instead of, the processing completion report, it is also possible to send the aforementioned first command (for example, an Inquiry command), or second command (for example, a device discovery command or read capacity command).

Upon receiving a processing completion report from the host terminal, the storage control device 100 reports the new virtual storage capacity value that was overwritten in S53 (S57).

The host terminal stores the new virtual storage capacity value reported by the storage control device 100 (S58).

In the foregoing processing sequence, the storage control device 100 may carry out processing for judging whether or not the old virtual storage capacity value has been reported to the host terminal, inbetween the processing in steps S53 and S54. In this case, if the judgment result is an affirmative one, then the storage control device 100 executes the processing in S54, and if the judgment result is a negative one, then it carries out the processing in S57, without executing the processing in S54.

An embodiment of the present invention was described above, but this is an example for the purpose of describing the present invention, and the scope of the present invention is not limited to this embodiment alone. The present invention may be implemented in various further modes.

For example, in the first embodiment of a storage control sup-system according to the present invention, if a maintenance terminal for carrying out processing for maintaining the storage control sub-system is connected to the storage control section, then the storage control section receives a unit preparation request for preparing a new virtual storage unit, from the maintenance terminal or an external terminal connected to the maintenance terminal, and in response to this unit preparation request, it provides a graphical user interface containing, at the least, an input box for the virtual storage capacity value, to the maintenance terminal or the external terminal, and it stores the virtual storage capacity value input to this input box, in the memory, as the established virtual storage capacity value.

For example, in a second embodiment of a storage control sub-system according to the present invention, if the storage control sub-system forms unit pairs consisting of two storage units, taking one of the storage units as a primary storage unit and the other storage unit as a secondary storage unit, in such a manner that a snap shot is taken which copies the data in the primary storage unit to the secondary storage unit, then a plurality of logical storage devices are provided in the physical storage device, this plurality of logical storage devices comprises two or more first logical storage devices having a logical storage region which can be associated with a virtual storage region, and one or more second logical storage devices having a logical storage region which cannot be associated with a virtual storage region, the one or more second logical storage devices constituting a single real storage unit connected to the host terminal, and the storage control section forming a unit pair, wherein the real storage unit it taken to be a primary storage unit and the virtual storage unit is taken to be a secondary storage unit, and performing a snap shot.

In a third embodiment of a storage control sub-system according to the present invention, for example, in the second embodiment described above, if the storage control section has not yet reported the virtual storage capacity value to the host terminal, then in the event that a unit pair comprising a virtual storage unit and a real storage unit has been formed, a value equal to the storage capacity value of that real storage unit is reported to the host terminal as the storage capacity value for the virtual storage unit.

In a fourth embodiment of a storage control sub-system according to the present invention, for example, in the third embodiment described above, if the storage control section has not found a real storage unit forming a partner for the virtual storage unit, then in the event that a read request or write request has been received for that virtual storage unit from the host terminal, the storage control section sends a report to the host terminal indicating that the virtual storage unit is in an uninstalled state, and if the real storage unit forming said partner is found, then it reports a value equal to the storage capacity value of the real storage unit, to the host terminal, as a storage capacity value for the virtual storage unit.

In a fifth embodiment of a storage control sub-system according to the present invention, for example, if the storage control section has received a read capacity command from the host terminal, then it reports the virtual storage capacity value stored in the memory to the host terminal.

In a sixth embodiment of a storage control sub-system according to the present invention, if a maintenance terminal for carrying out processing for maintaining the storage control sub-system is connected to the storage control section, and the host terminal has erased the stored virtual storage capacity value, by means of start-up processing or rescan processing performed by the host terminal, then in the event that the storage control section receives an update request relating to the virtual storage capacity value, from the maintenance terminal of an external terminal connected to the maintenance terminal, after it has reported the virtual storage capacity value to the host terminal, the new virtual storage capacity value is received from the maintenance terminal or external terminal and stored in the memory, and restart processing or rescan processing is implemented in the host terminal, while the host terminal and the virtual storage unit are not connected, thereby causing the old virtual storage capacity value that was previously stored in the host to be erased, whereupon the new virtual storage capacity value stored in the memory is reported to the host terminal.

What is claimed is:

1. A storage control sub-system coupled to a host terminal via a storage area network (SAN) and coupled to a management terminal, the storage control sub-system comprising:
   a plurality of physical storage devices; and
   a storage control section managing a plurality of logical storage devices comprising a first logical storage device, which is prepared from a first plurality of physical storage devices of said plurality of physical storage devices, and a second logical storage device, which is prepared from a second plurality of physical storage devices of said plurality of physical storage devices;
   wherein said storage control section manages a logical storage unit being provided to the host terminal after allocating to said first logical storage device,
   wherein said storage control section manages a virtually logical storage unit which is configured from a plurality of virtual storage regions and is provided to the host terminal without being allocated to said second logical storage device by establishing a virtual storage capacity value,
   wherein said storage control section manages a first Redundant Array of Inexpensive Disks (RAID) group of the first plurality of physical storage devices, and manages a second RAID group of the second plurality of physical storage devices, and receives a write request from said host terminal,
   wherein said storage control section controls to write data of said write request in a storage area of said first logical storage device which is already allocated to the logical storage unit, if said write request is targeted to said logical storage unit,
   wherein said storage control section controls to allocate a storage area of said second logical storage device and controls to write said data of said write request in said allocated storage area of said second logical storage device, if said write request is targeted to said virtually logical storage unit,
   wherein said storage control section receives a request for changing said virtual storage capacity value of said virtually logical storage volume from the management terminal,
   wherein said storage control section controls to reject said request for changing said virtual storage capacity value of said virtually logical storage volume, if said virtual storage capacity value of said virtually logical storage volume is already reported to the host terminal, and
   wherein said storage control section controls to change said virtual storage capacity value of said virtually logical storage volume based on said request for changing said virtual storage capacity value of said virtually logical storage volume, if said virtual storage capacity value of said virtually logical storage volume is not reported to the host terminal yet.

2. The storage control sub-system according to claim 1, wherein said storage control section receives a unit preparation request for preparing a newly virtually logical storage unit, from said maintenance terminal, and in response to said unit preparation request, supplies a graphical user interface comprising at least an input box for said virtual storage capacity value of said newly virtually logical storage unit, to said maintenance terminal, and causes the virtual storage capacity value input to said input box to be stored in a memory, as said established virtual storage capacity value.

3. The storage control sub-system according to claim 1, wherein said storage control sub-system is capable to form a unit pair consisting of two storage units, one storage unit being taken to be a primary storage unit and the other storage unit being taken to be a secondary storage unit, and is capable to perform a snap shot whereby the data in the primary storage unit is copied to the secondary storage unit, and
   wherein said storage control section performs said snap shot by forming said unit pair wherein said logical storage unit is taken to be said primary storage unit, and said virtually logical storage unit is taken to be a secondary storage unit.

4. The storage control sub-system according to claim 3, wherein if said storage control section forms said unit pair comprising said virtually logical storage unit and said logical storage unit, in a case where said virtual storage capacity value has not been reported to said host terminal, then a value equal to a storage capacity value of said logical storage unit is reported to said host terminal as the virtual storage capacity value for said virtually logical storage unit.

5. The storage control sub-system according to claim 4, wherein if said storage control section receives a read request or write request for the virtually logical storage unit from said host terminal, in a case where said logical storage unit which is a partner for said virtually logical storage unit has not been found, then the storage control section sends a report to the host terminal indicating that the virtually logical storage unit is in an uninstalled state, and if the logical storage unit which is said partner is subsequently found, it reports a value equal to the storage capacity value of said logical storage unit, to said host terminal, as said virtual storage capacity value for said virtually logical storage unit.

6. The storage control sub-system according to claim 1, wherein said storage control section reports the virtual storage capacity value stored in a memory, to said host terminal, if it has received a prescribed command from said host terminal.

7. A storage unit control method for a storage control sub-system coupled to a host terminal via a storage area network (SAN) and coupled to a management terminal, the storage control sub-system comprising a plurality of physical storage devices, and a storage control section, wherein said storage control section manages a plurality of logical storage devices comprising a first logical storage device, which is prepared from a first plurality of physical storage devices of said plurality of physical storage devices, and a second logical storage device, which is prepared from a second plurality of physical storage devices of said plurality of physical storage devices, wherein said storage control section manages a logical storage unit being provided to the host terminal after allocating to said first logical storage device, wherein said storage control section manages a virtually logical storage unit which is configured from a plurality of virtual storage regions and is provided to the host terminal without being allocated to said second logical storage device by establishing a virtual storage capacity value, and wherein said storage control section manages a first Redundant Array of Inexpensive Disks (RAID) group of the first plurality of physical storage devices, and manages a second RAID group of the second plurality of physical storage devices, the storage unit control method comprising:

receiving, by said storage control section, a write request from said host terminal;

controlling, by said storage control section, to write data of said write request in a storage area of said first logical storage device which is already allocated to the logical storage unit, if said write request is targeted to said logical storage unit;

controlling, by said storage control section, to allocate a storage area of said second logical storage device, and to write said data of said write request in said allocated storage area of said second logical storage device, if said write request is targeted to said virtually logical storage unit;

receiving, by said storage control section, a request for changing said virtual storage capacity value of said virtually logical storage volume from the management terminal;

controlling, by said storage control section, to reject said request for changing said virtual storage capacity value of said virtually logical storage volume, if said virtual storage capacity value of said virtually logical storage volume is already reported to the host terminal; and controlling, by said storage control section, to change said virtual storage capacity value of said virtually logical storage volume based on said request for changing said virtual storage capacity value of said virtually logical storage volume, if said virtual storage capacity value of said virtually logical storage volume is not reported to the host terminal yet.

8. The storage unit control method according to claim 7, comprising:

receiving, by said storage control section, a unit preparation request for preparing a newly virtually logical storage unit, from said maintenance terminal;

supplying, in response to said unit preparation request, a graphical user interface comprising at least an input box for said virtual storage capacity value of said newly virtually logical storage unit, to said maintenance terminal; and causing the virtual storage capacity value input to said input box to be stored in a memory, as said established virtual storage capacity value.

9. The storage unit control method according to claim 7, comprising:

forming a unit pair consisting of two storage units, one storage unit being taken to be a primary storage unit and the other storage unit being taken to be a secondary storage unit; and performing a snap shot whereby the data in the primary storage unit is copied to the secondary storage unit, wherein said snap shot is performed by forming said unit pair wherein said logical storage unit is taken to be said primary storage unit, and said virtually logical storage unit is taken to be a secondary storage unit.

10. The storage unit control method according to claim 7, comprising:

reporting the virtual storage capacity value stored in a memory, to said host terminal, if it has received a prescribed command from said host terminal.

* * * * *